United States Patent [19]

Hoare

[11] Patent Number: 4,960,922

[45] Date of Patent: Oct. 2, 1990

[54] PROCESS TO DEHYDROHALOGENATE ESTERS OF PENTAHALOPROPYLDIMETHYLCYCLO-PROPANECARBOXYLIC ACIDS USING A CATALYTIC AMOUNT OF 1,8-DIAZABICYCLO[(5.4.0]UNDECENE-7-ENE IN COMBINATION WITH STOICHIOMETRIC AMOUNTS OF BASE

[75] Inventor: John H. Hoare, Hamilton Square, N.J.

[73] Assignee: FMC Corporation, Philadelphia, Pa.

[21] Appl. No.: 323,652

[22] Filed: Mar. 15, 1989

[51] Int. Cl.$^5$ ............................................. C07C 67/317
[52] U.S. Cl. ..................................................... 560/124
[58] Field of Search ......................................... 560/124

[56] References Cited

U.S. PATENT DOCUMENTS

| | | | |
|---|---|---|---|
| 3,761,436 | 9/1973 | Hashimoto | 260/251 |
| 4,238,505 | 12/1980 | Engel | 424/305 |
| 4,551,281 | 11/1955 | Crosby | 260/465 |

FOREIGN PATENT DOCUMENTS 985505 3/1965 United Kingdom .

OTHER PUBLICATIONS

Chem. Abst. 90: 168,723v.
Chem. Abst. 91: 193,288k.
Chem. Abst. 97: 19,758d.

*Primary Examiner*—Michael L. Shippen
*Attorney, Agent, or Firm*—Stanford M. Back; H. Robinson Ertelt

[57] ABSTRACT

Esters of cis or trans-3[2-(E/Z)-chloro-3,3,3-trifluoro-1-propenyl)-2,2-dimethlcyclopropanecarboxylic acid, or mixtures thereof, which are useful as insecticides or as intermediaes of pyrethroid insecticides may be prepared by the dehydrohalogenation of corresponding esters of cis/trans-3(2,2-dichloro-3,3,3-trifluoropropyl)-2,2-dimethylcyclopropanecarb oxylic acid with a catalytic amount of a cyclic amidine in the presence of a stoichiometric amount of an alkali metal or alkaline earth metal base, or combinations thereof and a polar aprotic solvent. The use of cyclic amidines as dehydrohalogenation catalysts permits reactions to be carried out at lower temperatures, shorter reaction times, and with reduced unwanted by-products compared with prior art methods using metal bases alone.

11 Claims, No Drawings

PROCESS TO DEHYDROHALOGENATE ESTERS OF PENTAHALOPROPYLDIMETHYLCYCLO-PROPANECARBOXYLIC ACIDS USING A CATALYTIC AMOUNT OF 1,8-DIAZABICYCLO[(5.4.0]UNDECENE-7-ENE IN COMBINATION WITH STOICHIOMETRIC AMOUNTS OF BASE

BACKGROUND OF THE INVENTION

This invention relates to a process for the preparation of certain esters of cyclopropane carboxylic acid which are both valuable insecticides, and intermediates in the preparation of other useful insecticides. More particularly, this invention relates to a process for the preparation of esters of cis or trans isomers, or mixtures thereof, (hereinafter "cis/trans" shall be intended to included either isomer or a mixture thereof) of 3-[2 -(E/Z)-halo-3,3,3-trihalo-1-propenyl]-2,2-dimethylcyclopropanecarboxylic acid. Still more particularly, this invention relates to an improved process for preparing said esters by the dehydrohalogenation of the corresponding esters of cis/trans-3-(2,2-dihalo-3,3,3-trihalopropyl)-2,2-dimethylcyclopropanecarboxylic acid.

These products are useful, for example, as soil insecticides against such insects as species of *Diabrotica*. Alternatively, these compounds, when in the form of their lower alkyl ester, are useful as intermediates for the preparation of pyrethroids by known transesterification methods or the like.

U.S. Pat. No. 4,551,281 describes a process for the preparation of said cyclopropane carboxylic acid esters by conducting the above-defined dehydrohalogenation with an alkali metal carbonate such as sodium or potassium carbonate in a polar aprotic solvent at elevated temperatures. There are, however, a number of problems inherent in the process as described above. One problem is that in order for the process to be efficacious the dehydrohalogenation must be conducted at a relatively high reaction temperature of 130°–150° C. or above. In addition, the by-product ester of cis/trans-3-(3,3,3-trifluoro-1-propynyl)-2,2-dimethylcyclopropanecarboxylic acid comprises 18–20% of the reaction product. This by-product product reacts further to produce other by-products such as the ester of cis/-trans-3-acetyl-2,2-dimethylcyclopropanecarboxylic acid. A purification procedure, such as a distillation, would add to the expense of the overall process, including the expense of the loss of the alcohol portion. Also, in the process as described above all or part of the ester of trans-[2-(E/Z)-chloro-3,3,3-trifluoro-1-propenyl]-2,2-dimethylcyclopropanecarboxylic acid that is formed is destroyed.

Attempts have been made to employ cyclic amidines such as 1,8-diazabicyclo[5.4.0]undec-7-ene (DBU) or 1,5-diazabicyclo[4.3.0]non-5-ene (DBN) as the dehydrohalogenating agents. This latter compound has previously been used by the Japanese to dehydrohalogenate certain chlorinated dithiolylidenmalonic acid esters and chlorinated alkyl silanes to form the corresponding unsaturated products. See, for example Takehana et al., Chemical Abstracts, 91:193288k and Takamizawa et al., 90:168723v, respectively, as well as Mochida et al., Chemical Abstracts 97:19758d. However, these processes employ high temperatures and are characterized by low yields. Moreover, when DBU is employed in at least stoichiometric amounts to dehydrohalogenate, for example, the esters of cis/trans-3-[2,2-dichloro-3,3,3-trifluoropropyl]-2,2-methylcyclopropanecarboxylic acid, it has been found that while the corresponding cis/trans 1-propenyl compounds are formed with good conversion, nevertheless the DBU is difficult to recover and convert back to the free base, thus making use of this costly material wholly uneconomical on a commercial scale.

SUMMARY OF THE INVENTION

In accordance with the present invention, it has now been found that the esters of cis/trans-3-[2- (E/Z)-halo-3,3,3-trihalo-1-propenyl]-2,2-dimethylcyclopropanecarboxylic acid can readily be obtained in excellent yield by the dehydrohalogenation of the corresponding esters of cis/trans-3-(2,2-dihalo-3,3,3-trihalopropyl)-2,2-dimethylcyclopropanecarboxylic acid using catalytic amounts of a cyclic amidine in the presence of an alkali metal or alkaline earth metal base, or combinations thereof, and a polar aprotic solvent, under essentially anhydrous conditions. By the term "halo" as used throughout is meant to include fluroro, chloro, bromo and iodo.

The process of this invention may be described in accordance with the following reaction scheme:

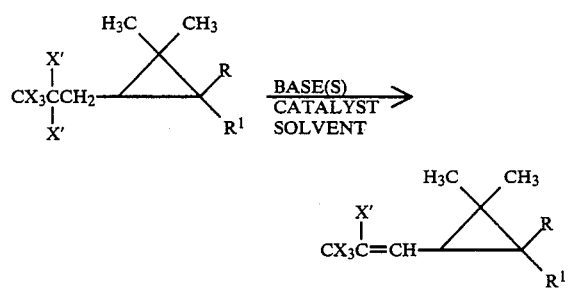

wherein R includes formyl, acetyl, cyano, $CO_2R^2$ and $SO_2R^3$, wherein $R^2$ is $C_{1-6}$ lower alkyl, arylalkyl, substituted arylalkyl, and $R^3$ is $C_{1-6}$ lower alkyl, and wherein the substituted arylalkyl may be substituted by one or more groups including alkyl, halo, nitro, alkoxy, phenoxy, or the like, as for example 2,6-dichlorophenyl moieties; $R^1$ is hydrogen or $CO_2R^3$, wherein $R^3$ is as defined above; and X and X' are halo, and may be the same or different, although X' is preferably chloro and X is preferably fluoro.

In a preferred embodiment, as hereinafter described, esters of cis/trans-3(2,2-dichloro-3,3,3-trifluoropropyl)-2,2-dimethylcyclopropanecarboxylic acid are dehydrohalogenated in accordance with this process to form the corresponding ester of cis/trans-3-[2- (E/Z)-chloro-3,3,3-trifluoro-1-propenyl]-2,2-dimethylcyclopropanecarboxylic acid.

This novel dehydrohalogenation process gives better yields at lower reaction temperatures and shorter reaction times than those dehydrohalogenation processes taught in U.S. Pat. No. 4,551,281 (above). Most important, the novel process eliminates or reduces the formation of the 1-propynyl ester by-product to an acceptable amount, and does not destroy the trans-isomer of the 1-propenyl ester product. This novel process thus encompasses all of the benefits of dehydrohalogenation using catalytic amounts of a cyclic amidine such as DBU while advantageously lowering the cost sufficiently to allow the use of such a catalyst in a commercial-sized dehydrohalogenation process.

Thus it has been found that at the relatively low temperatures at which this reaction is carried out the bases alone without cyclic amidine present, which are desirably present in stoichiometric amounts, do not effectively dehydrohalogenate the halogenated propyl compound to the corresponding propenyl product. (See, for example, Run 46.) Rather, in accordance with this process, it is only when catalytic amounts of a cyclic amidine such as DBU or DBN are employed in combination with said bases that this conversion takes place in significant amounts up to greater than 90%, particularly when certain preferred bases are employed. While applicant does not wish to be bound by any particular theory, it is believed that the cyclic amidine forms a hydrohalide salt with the hydrogen halide byproduct, and that the presence of stoichiometric amounts of base serves to remove the hydrogen halide from the amidine, thereby regenerating the latter material in situ for possible recycling without the need for recovery and regeneration of said cyclic amidine.

DETAILED DESCRIPTION

In this novel process, to prepare esters of cis/trans-3-[2-(E/Z)-chloro-3,3,3-trifluoro-1-propenyl]-2,2-dimethylcyclopropanecarboxylic acid by the dehydrohalogenation of the corresponding esters of cis/trans-3-(2,2-dichloro-3,3,3-trifluoropropyl)-2,2-dimethylcyclopropanecarboxylic acid, a number of alkali metal and alkaline earth metal bases and, preferably, combinations thereof, may successfully be used in conjunction with catalytic amounts of the cyclic amidine. When mixtures of bases are used, the ratio of these mixtures is not critical as long as no significant hydrolysis occurs, i.e., as long as the resulting mixture is not too caustic to cause significant hydrolysis of the ester.

Those bases that may be used include, for example, the carboxylates of sodium or potassium, preferably acetates and propionates; bicarbonates of sodium, potassium, and calcium; the carbonates and bicarbonates of lithium, sodium, potassium, rubidium, cesium, strontium and barium; and the oxides of magnesium and calcium. Of these, the acetates of sodium and potassium are especially preferred, and particularly in combination with calcium oxide. The oxides of calcium and magnesium alone, on the other hand, while effective, are more preferred when used at higher temperatures and/or in combination with the above acetates. Of the carbonates and bicarbonates, the sodium and potassium are preferred over the other alkali metal or alkaline earth metal compounds because of their greater solubility over these latter compounds. Stronger bases, such as sodium, potassium, or calcium hydroxide, are not desirable because they tend to hydrolyze the ester and the DBU. Thus, in general, any base or combination of bases which do not significantly hydrolyze the ester group may be employed. While preferably stoichiometric amounts of these bases are used, the exact amounts are not critical, and excess base may be employed if desired.

In this novel process, the successful dehydrohalogenation reaction may be conducted under essentially anhydrous conditions in the liquid phase using stoichiometric amounts, generally about 0.5 to 8 molar equivalents, based on the amount of propyl starting material to be dehydrohalogenated, of any one of the above named bases and a catalytic amount, preferably 0.05 to 0.5 molar equivalents, of a cyclic amidine such as DBU or DBN or mixtures thereof, in a polar or non-polar aprotic solvent. The reaction is preferably carried out under anhydrous conditions to avoid hydrolysis of the ester and destruction of the cyclic amidine. By "essentially anhydrous" is meant that small amounts of water may be present to the extent that it does not cause any significant hydrolysis or destruction of the cyclic amidine.

The solvent is preferably a polar, aprotic one, such as acetonitrile, hexamethylphosphoramide, diethylformamide, dimethylformamide, dimethylacetamide, or dimethylsulfoxide, wherein the amount of solvent, while not critical, is desirably in the ratio of about 0.5 to 10 mL per gram of propyl starting material to be dehydrohalogenated, and more preferably 2 to 3 mL per gram.

The reaction may desirably be conducted at a temperature of from about room temperature to 150° C., desirably about 50 to 150° C., and most preferably at 70 to 100° C., for about 1 to 170 hours, preferably 7 to 15 hours. From these ranges it will be seen that the time and temperature are not critical, and may be optimized routinely by varying one or both conditions. However, at room temperature it is often necessary, to carry out the reaction for much longer periods of time. Thus, generally, the higher temperatures are preferred.

In a preferred method within the scope as described above, the successful dehydrohalogenation may be conducted by using about 1 to 3 molar equivalents of either one of the bicarbonates of sodium or potassium catalyzed with about 0.25 to 0.30 molar equivalents of DBU in dimethylacetamide, in the ratio of about 2 to 3 mL per gram of the 2,2-dichloropropyl starting material to be dehydrohalogenated. A reaction temperature of about 70° C. to 100° C. and a reaction time of about 2 to 24 hours are most efficacious.

In another, more preferred embodiment of the novel process, the successful dehydrohalogenation reaction may be conducted using about 1 to 5 molar equivalents of an alkali metal salt, such as the acetate of sodium or potassium, in combination with about 0.25 to 1.5 molar equivalents of an alkaline earth metal oxide, such as the oxide of magnesium or calcium, particularly the latter. The broad reaction conditions described above for the cyclic amidine catalyst, aprotic solvent, reaction time and reaction temperature are applicable in this preferred dehydrohalogenation reaction process as well.

In a most preferred method within the scope as described above, the successful dehydrohalogenation reaction may be conducted using about 1.5 to 1.7 molar equivalents of sodium acetate in combination with about 0.3 to 0.5 molar equivalents of calcium oxide and catalyzed with about 0.25 to 0.30 molar equivalents of DBU in dimethylacetamide in the ratio of about 2 to 3 mL per gram of propyl starting material to be dehydrohalogenated. A reaction temperature of about 70° C. to 100° C., and a reaction time of about 2 to 24 hours are again most efficacious. The dehydrohalogenation process, when conducted in the most preferred method, gives increased yields of the 1-propenyl product in a relatively short period of time.

The novel, commercially viable dehydrohalogenation process as described herein includes the ester derivatives of both cis and/or trans 3-(2,2-dichloro-3,3,3-trifluoropropyl)-2,2-dimethylcyclopropanecarboxylic acid and the corresponding cis/trans-3-[2-(E/Z)-chloro-3,3,3-trifluoro-1-propenyl]-2,2-dimethylcyclopropanecarboxylic acid ester. Moieties encompassed by the term "ester" include, but are not limited to, $C_{1-6}$ lower alkyl such as methyl or ethyl; arylalkyl such as phenylmethyl; and substituted arylalkyl such as 2,6-dichlorophenylmethyl, 3-phenoxyphenylmethyl, α-cyano-3-phenoxyphenylmethyl, α-ethynyl-3-phenoxyphenylmethyl, (2-methyl[1,1'-biphenyl]-3-yl)methyl, 4-methyl-2,3,5,6-tetrafluorophenylmethyl and the like.

The solvents employed, as set forth above, are aprotic, polar materials. Included amongst these are dimethylformamide, diethylformamide, acetonitrile, hexamethylphosphoramide, dimethylacetamide, and the like. These solvents may, if desired, be recovered and recycled.

The dehydrohalogenation is optimally carried out in an inert atmosphere. This expedient is desirable because it prevents atmospheric water from destroying the DBU. Upon completion of the reaction, the desired dehydrohalogenated product is recovered by pouring the reaction mixture into an aqueous acid and extracting the product into an organic solvent.

It will be seen from the foregoing that the instant process has many surprising advantages over the prior art. Thus, this liquid phase dehydrohalogenation process gives good yields at low reaction temperatures and short reaction times. Additionally, the novel process eliminates or reduces the formation of the 1-propynyl ester by-product to an acceptable amount, and does not destroy the trans-isomer of the 1-propenyl ester product. That is to say, the starting ratio of cis and trans is substantially maintained throughout the process, as shown below. The novel process thus encompasses all of the benefits of dehydrohalogenation using stoichiometric amounts of the cyclic amidine such as DBU while using only catalytic amounts, which advantageously lowers the cost sufficiently to allow the use of, e.g., DBU in a commercial sized dehydrohalogenation process.

When a mixture of cis and trans isomers, rather than a pure isomer, is preferred, the desired ratio of the cis:trans isomers in the starting material and product, while not critical, is generally in the range of from about 55:45 to 90:10, and desirably about 55:45 to 65:35. It will be understood, however, that such mixtures are not essential, and that up to 100% of either isomer may be used.

The process of this invention will now be illustrated by the following examples. In these examples, the cis/trans ratios were measured by gas chromatographic analysis, and the approximate ratios are indicated by area %.

EXAMPLE 1

Dehydrohalogenation of 2,6-dichlorophenylmethyl cis/trans-3-(2,2-dichloro-3,3,3-trifluoropropyl)-2,2-dimethylcyclopropanecarboxylate using sodium acetate in combination with calcium oxide in the presence of a catalytic amount of DBU Seven hundred seventy-one and one-half grams (1.76 moles; (1.0 equiv.) of 2,6-dichlorphenylmethyl cis/trans-3-(2,2-dichloro-3,3,3-trifluoropropyl)-2,2-dimethycyclopropanecarboxylate; 246.0 g (3.0 moles; 1.70 equiv.) of sodium acetate, 44.0 g (0.78 mole; 0.45 equiv.) of calcium oxide and 76.0 g (0.50 mole; 0.28 equiv.) of DBU in 2000 mL (2.6 mL/g of starting ester) of dimethylacetamide were placed in a five liter Morton flask equipped with a mechanical stirrer, temperature controller, reflux condenser and heating mantle. The stirred reaction mixture was heated to 82°-93° C. where it was maintained for 22.25 hours of a total reaction time of 23.5 hours. During this time the reaction was monitored by gas chromatographic (GC) analyses, which indicated a 93.2% conversion, based on the weight of the starting material, to the expected reaction products after the 23.5 hour reaction period. The reaction mixture was concentrated under reduced pressure (87°-97° C./1 mm) by the removal of 1500 mL of dimethylacetamide. The concentrate was stirred with 4000 mL of hexanes as 250 mL of concentrated hydrochloric acid was added. The mixture was stirred for 15-30 minutes, and 2500 mL of water was added. The mixture was stirred for an additional 10-20 minutes, and the organic layer was separated. The organic layer was again treated with 250 mL of concentrated hydrochloric acid and 2500 mL of water as described above and then was washed with two 2000 mL portions of water. The organic layer was dried with magnesium sulfate, filtered, and concentrated under reduced pressure (98° C./1.7 mm) to yield 724 g of residual oil. GC analysis of the oil indicated it to be 92.05% (wt/wt) 2,6-dichlorophenylmethyl cis/trans-3-[2-(E/Z)-chloro-3,3,3-trifluoro-1-propenyl]-2,2-dimethylcyclopropanecarboxylate. The yield was 666.4 g (94.0%, based on the amount of starting material initially charged), the cis/trans ratio of the starting material was 61:39, while that of the product was 56:44.

The NMR spectrum was consistent with the proposed structure.

EXAMPLE 2

Dehydrohalogenation of 2,6-dichlorophenylmethyl cis/trans-3-(2,2-dichloro-3,3,3-trifluoropropyl)-2,2-dimethylcyclopropanecarboxylate using sodium acetate in the presence of a catalytic amount of DBU The reaction mixture consisting of 4.0 g (0.0091 mole; 1.0 equiv.) of 2,6-dichlorophenylmethyl cis/trans-3-(2,2-dichloro-3,3,3-trifluoropropyl)-2,2-dimethylcyclopropanecarboxylate; 3.7 g (0.00455 mole; 5.0 equiv.) of ground sodium acetate, and 0.35 g (0.0023 mole; 0.25 equiV.) of DBU in 10 mL (2.5 mL/g of starting ester) of dimethylacetamide was stirred under a nitrogen atmosphere at 80° C. for 24 hours. Gas chromatographic analysis of the reaction mixture indicated an 87% conversion to the expected reaction products. The heat source was removed, and the reaction mixture allowed to cool to ambient temperature where it stirred for 72 hours. G. analysis of the reaction mixture at this time indicated a 94% conversion to the expected reaction products. The reaction mixture was partitioned in heptane/water. The organic layer was washed with an aqueous 10% hydrochloric acid solution and then with water. The organic layer was dried with magnesium sulfate and filtered. The filtrate was concentrated under reduced pressure to yield 3.37 g (92.3%, based on the amount charged) of 2,6-dichlorophenylmethyl cis/trans-3-[2-(E/Z)-chloro-3,3,3-trifluoro-1-propenyl]-2,2-dimethylcyclopropanecarboxylate. The cis/trans ratio of the starting material was 87:13, while that of the product was 90:10.

EXAMPLE 3

Dehydrohalogenation of 2,6-dichlorophenylmethyl cis/trans-3-(2,2-dichloro-3,3,3-trifluoropropyl)-2,2-dimethylcyclopropanecarboxylate using potassium acetate in the presence of a catalytic amount of DBU The reaction mixture consisting of 5.0 g (0.0114 mole; 1.0 equiv.) of 2,6-dichlorophenylmethyl cis/trans-3-

(2,2-dichloro-3,3,3-trifluoropropyl)-2,2-dimethylcyclopropanecarboxylate, 5.6 g (0.057 mole; 5.0 equiv.) of ground potassium acetate, and 0.43 g (0.0028 mole; 0.25 equiv.) of DBU in 12.5 mL (2.5 mL/g of starting ester) of dimethylacetamide was stirred under a nitrogen atmosphere at 85° C. for 48.0 hours. Gas chromatographic analysis of the reaction mixture at this time indicated a 95% conversion to 2,6-dichlorophenylmethyl cis/trans-3-[2-(E/Z)-chloro-3,3,3-trifluoro-1-propenyl]-2,2-dimethylcyclopropanecarboxylate. The cis/trans ratio of the starting material was 87:13, while that of the product was 90:10.

EXAMPLE 4

Dehydrohalogenation of 2,6-dichlorophenylmethyl cis/trans-3-(2,2-dichloro-3,3,3-trifluoropropyl)-2,2-dimethylcyclopropanecarboxylate using calcium oxide in the presence of a catalytic amount of DBU The reaction mixture consisting of 10.0 grams (0.0288 mole; 1.0 equiv.) of 2,6-dichlorophenylmethyl cis/trans-3-(2,2-dichloro-3,3,3-trifluoropropyl)-2,2-dimethylcyclopropanecarboxylate, 0.51 g (0.0091 mole; 0.4 equiv.) of calcium oxide and 0.87 g (0.0057 mole; 0.25 equiv.) of DBU in 25 mL (2.5 mL/g of starting ester) of dimethylacetamide was stirred under an argon atmosphere at 80°-85° C. for 4.0 hours. Gas chromatographic analysis of the reaction mixture at this time indicated a 79% conversion to the expected reaction products. An additional 0.26 g (a total of 0.6 equiv.) of calcium oxide was added to the reaction mixture, which continued to stir under an argon atmosphere at 80° C. for an additional 16.5 hours (a total of 20.5 hours). GC analysis of the reaction mixture at this time indicated an 85% conversion to 2,6-dichlorophenylmethyl cis/trans-3-[2-(E/Z)-chloro-3,3,3-trifluoro-1-propenyl]-2,2-dimethylcyclopropanecarboxylate. The cis/trans ratio of the starting material was 63:37, while that of the product was 65:35.

EXAMPLE 5

Dehydrohalogenation of methyl cis/trans-3-(2,2-dichloro-3,3,3-trifluoropropyl)-2,2-dimethylcyclopropanecarboxylate using potassium bicarbonate in the presence of a catalytic amount of DBU The reaction mixture consisting of 25.0 g (0.085 mole; 1.0 equiv.) of methyl cis/trans-3-(2,2-dichloro-3,3,3-trifluoropropyl)-2,2-dimethycyclopropanecarboxylate, 35.0 g (0.35 mole; 4.1 equiv.) of ground potassium bicarbonate, and 3.3 g (0.021 mole; 0.25 equiv.) of DBU in 50 mL (2.0 mL/g of starting ester) was stirred under a nitrogen atmosphere at 80° C. for 21 hours. The reaction mixture was cooled and poured into 100 mL of heptane. The resultant mixture was washed with water, aqueous 10% hydrochloric acid solution, and again with water. The combined aqueous layers were extracted with heptane. The combined heptane layers were dried with magnesium sulfate and filtered. The filtrate was concentrated under reduced pressure to yield 19.7 g (89.8%, based on the amount charged) of methyl cis/trans-3-[2- (E/Z)-chloro-3,3,3-trifluoro-1-propenyl]-2,2-dimethylcyclopropanecarboxylate. The cis/trans ratio of the starting material was 78:22, while that of the product was 73:27.

EXAMPLE 6

Dehydrohalogenation of 2,6-dichlorophenylmethyl cis/trans-3-(2,2-dichloro-3,3,3-trifluoropropyl)-2,2-dimethylcyclopropanecarboxylate using sodium bicarbonate in the presence of a catalytic amount of DBU The reaction mixture consisting of 4.0 g (0.0091 mole; 1.0 equiv.) of 2,6-dichlorophenylmethyl cis/trans-3-(2,2-dichloro-3,3,3-trifluoropropyl)-2,2-dimethylcyclopropanecarboxylate, 1.5 g (0.0182 mole; 2.0 equiv.) of ground sodium bicarbonate, and 0.35 g (0.0023 mole; 0.25 equiv.) of DBU in 10 mL (2.5 mL/g of starting ester) of dimethylacetamide was stirred under a nitrogen atmosphere at 80° C. for 24 hours. Gas chromatographic analysis of the reaction mixture after this time indicated a 95.3% conversion to the expected reaction products. The reaction mixture was taken up in 30 mL of heptane and washed with two portions of an aqueous 10% hydrochloric acid solution and two portions of water. The organic layer was dried with sodium sulfate and filtered. The filtrate was concentrated under reduced pressure to yield 2.6 g (71%, based on the amount charged) of 2,6-dichlorophenylmethyl cis/trans-3-[2-(E/Z)-chloro-3,3,3-trifluoro-1-propenyl]-2,2-dimethylcyclopropanecarboxylate. The cis/trans ratio of the starting material was 60:40, while that of the product was 62:38.

EXAMPLE 7

Dehydrohalogenation of 2,6-dichlorophenylmethyl cis/trans-3-(2,2-dichloro-3,3,3-trifluoropropyl)-2,2-dimethylcyclopropanecarboxylate using potassium carbonate in the presence of a catalytic amount of DBU The reaction mixture consisting of 10.3 g (0.0234 mole; 1.0 equiv.) of 2,6-dichlorophenylmethyl cis/trans-3-(2,2-dichloro-3,3,3-trifluoropropyl)-2,2dimethylcyclopropanecarboxylate, 6.5 g (0.047 mole; 2.0 equiv.) of ground potassium carbonate, and 0.89 g (0.0058 mole; 0.25 equiv.) of DBU in 12.5 mL (1.2 mL/g of starting ester) of dimethylacetamide was stirred under a nitrogen atomosphere at 48°-51° C. for eight hours and then at ambient temperature for approximately 90 hours. Gas chromatographic analysis of the reaction mixture after a total reaction time of 33 hours indicated a 95% conversion to the expected reaction products. After the 90 hour reaction time the reaction mixture was poured into 50 mL of heptane. The mixture was washed with water, aqueous 10% hydrochloric acid solution, and again with water. The organic layer was dried with magnesium sulfate and filtered. The filtrate was concentrated under reduced pressure to yield 6.9 g (73%, based on the amount charged) of 2,6-dichlorophenylmethyl cis/trans-3-[2-(E/Z)-chloro-3,3,3-trifluoro-1-propenyl]-2,2-dimethylcyclopropanecarboxylate. The cis/trans ratio of the starting material was 58:42, while that of the product was 62:38.

EXAMPLE 8

Dehydrohalogenation of 2,6-dichlorophenylmethyl cis/trans-3-(2,2-dichloro-3,3,3-trifluoropropyl)-2,2-dimethylcyclopropanecarboxylate using sodium carbonate in the presence of a catalytic amount of DBU The reaction mixture consisting of 6.0 g (0.0137 mole; 1.0 equiv.) of 2,6-dichlorophenylmethyl cis/trans-3-(2,2-dichloro-3,3,3-trifluoropropyl)-2,2-dimethylcyclopropanecarboxylate, 2.9 g (0.0274 mole; 2.0 equiv.) of ground sodium carbonate, and 0.5 g (0.0034 mole; 0.25 equiv.) of DBU in 15 mL (2.5 mL/g of starting ester) of dimethylacetamide was stirred under a nitrogen atmosphere at 60° C. for 24 hours. Gas chromatographic analysis of the reaction mixture at this time indicated a 71% conversion to the expected reaction products. The reaction mixture was poured into 100 mL of aqueous 2 N hydrochloric acid and 50 mL of diethyl ether. The mixture was shaken and the organic layer was separated. The organic layer was dried with magnesium sulfate and filtered. The filtrate was concentrated under reduced pressure to yield 5.6 g of an oil that was 70% of the product, i.e. 2,6-dichlorophenylmethyl cis/trans-3-[2-(E/Z)-chloro-3,3,3-trifluoro-1-propenyl)-2,2-dimethylcyclopropanecarboxylate.

In accordance with the general procedures of Examples 1 to 8 above, but varying reaction conditions catalysts, bases, solvents and the like, as shown in Table I below, a series of runs was carried out illustrating further embodiments of this process, the results of which are set forth in said table.

Unless otherwise noted, the reaction products (see last two columns of Table I) were analyzed by gas chromatography using an OV225 column and the results given in area percent. The OV225 column is one chosen by those skilled in the art to separate cis and trans isomers of synthetic pyrethroids. During the course of the experimentation it was determined that the trans-3-[2-(E)-chloro-3,3,3-trifluoro-1-propenyl]-2,2-dimethylcyclopropanecarboxylic acid ester reaction product (B) had the same retention time as the starting cis-3-(2,2-dichloro-3,3,3-trifluoropropyl)-2,2-dimethylcyclopropanecarboxylic acid ester (A). Both compounds thus appeared as one peak on the gas chromatography spectra. Initially it was thought that this one peak on the GC spectra was only the cis-isomer of starting material (A), which indicated that the reaction had not gone to completion. When efforts to force the reaction to completion failed, it was then thought that the peaks on the G. spectra attributed to starting ester (A) included some reaction product. G. analysis of some of the reaction mixtures using an SP2100 column confirmed this.

Set forth below is a description of what materials were present in each G. peak for each of the columns used.

| GC Analysis of the Reaction Mixture (area %) using an OV225 Column | | | |
|---|---|---|---|
| 1-Propenyl Ester (B) | | Propyl Ester (A) | |
| cis | trans | cis | trans |
| cis,E/Z-isomer of reaction product (B) | trans,Z-isomer of reation product (B) | cis-isomer of starting material (A) and trans,E-isomer of reaction product (B) | trans-isomer of starting material (A) |

| Analysis of Reaction Mixture (area %) using an SP2100 Column | | | |
|---|---|---|---|
| 1-Propenyl Ester (B) | | Propyl Ester (A) | |
| cis | trans | cis | trans |
| cis,E/Z isomers or reaction product (B) and trans,Z-isomer of reaction product (B) | trans,E-isomer or reaction product (B) | cis-isomer of starting material (A) | trans-isomer of starting material (A) |

By the terms "OV225 column", "SP2100 column," and "R.T.," as used above and in Table I below are meant the following:

OV225 column—a cyanophenyl phase silicone packing, available from Supelco Inc., Bellefonte, Pa.;

SP2100 column—a methyl phase silicone packing, also available from Supelco;

R.T.—room temperature.

When the results of these many runs and examples are compared with those of Run 46, where only a mixture of bases are employed, but no DBU or the like, it will be seen that as much as about a 3- to 4-fold increases in the product are obtained by the process of this invention, particularly when the preferred bases of this invention are employed.

Of these runs, Runs 80, 82 and 84 to 88 are comparative examples showing the relative ineffectiveness of bases falling outside the scope of this invention.

Unless indicated otherwise, where no trans isomer is shown in the last column ("propyl ester (A)") but is disclosed in the product ("propenyl ester (B)") after a given period of time, it will be understood that the trans ester was present in the initial starting material, but was more rapidly converted to the trans propenyl ester than the corresponding cis starting isomer. In other words, the ratios of cis and trans isomers in the starting material and final product remain essentially unchanged by this process, notwithstanding the more rapid dehydrohalogenation of the trans starting isomer at the beginning of the reaction.

TABLE 1

Process for the Dehydrohalogenation of 3-(2,2-Dichloro-3,3,3-trifluoropropyl)-2,2-dimethylcyclopropanecarboxylic Acid Esters

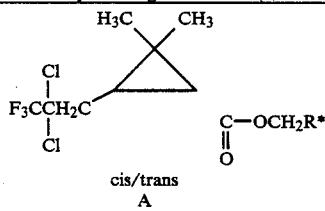 base(s) DBU (cat.) solvent 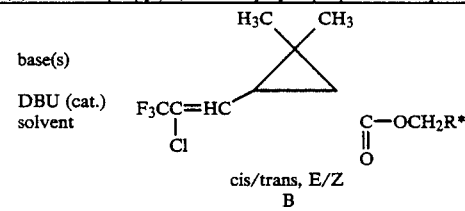

| Run | Propyl Ester (A);[1] Weight/Moles/ Equiv. | Base(s) Weight/Moles/Mol Equiv. | DBU[2]; Weight/Moles/ Mol Equiv. | Solvent; ml/gram of Propyl Ester | Reaction Temperature (°C.) | Time into Reaction (hr) | GC Analysis of the Reaction Mixture (area %) | | | |
|---|---|---|---|---|---|---|---|---|---|---|
| | | | | | | | 1-Propenyl Ester (B)[1] | | Propyl Ester (A) | |
| | | | | | | | cis | trans | cis | trans |
| 1 | 10.0 grams 0.023 mole | Ca(OAc)$_2$; 3.6 grams | 0.87 gram 0.006 mole | DMA[3] 2.5 ml/gram | 70° | 1.0 hr 2.0 hr | 12.6 13.3 | 11.6 12.2 | 49.6 48.9 | 24.3 23.6 |

TABLE 1-continued

Process for the Dehydrohalogenation of 3-(2,2-Dichloro-3,3,3-trifluoropropyl)-2,2-dimethylcyclopropanecarboxylic Acid Esters

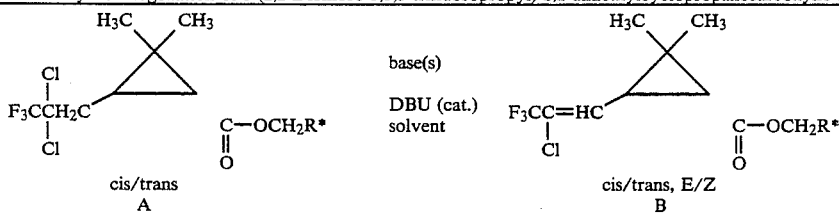

| Run | Propyl Ester (A);[1] Weight/Moles/ Equiv. | Base(s) Weight/Moles/Mol Equiv. | DBU[2]; Weight/Moles/ Mol Equiv. | Solvent; ml/gram of Propyl Ester | Reaction Temperature (°C.) | Time into Reaction (hr) | 1-Propenyl Ester (B)[1] cis | trans | Propyl Ester (A) cis | trans |
|---|---|---|---|---|---|---|---|---|---|---|
| | 1.0 equiv. | 0.023 mole 1.0 equiv. | 0.25 equiv. | | | 4.0 hr 6.0 hr | 13.7 13.8 | 12.7 12.7 | 48.5 48.4 | 23.2 23.1 |
| | The reaction mixture was heated at 70° C. for the entire 6.0 hour reaction time. | | | | | | | | | |
| 2 | 5.0 g 0.0114 mole 1.0 equiv. | KOAc; 5.6 g 0.057 mole 5.0 equiv. | 0.43 g 0.0028 mole 0.25 equiv. | DMA 2.5 | 85 | 1.0 2.0 6.0 24.0 48.0 | 43.2 52.2 65.2 81.7 90.1 | 1.6 1.8 2.2 2.7 3.3 | 53.9 45.0 29.4 12.0 4.8 | 0.7 0.2 0.1 0 0 |
| | The reaction mixture was heated at 85° C. for the entire 48.0 hour reaction time. | | | | | | | | | |
| 3 | 4.0 g 0.0091 mole 1.0 equiv. | EtCO2Na 4.4 g 0.0455 mole 5.0 equiv. | 0.35 g 0.0023 mole 0.25 equiv. | DMA 2.5 | R.T. to 123 | 1.5 3.0 6.0 24.0 | 40.4 46.9 53.9 51.9 | 24.9 23.3 23.7 22.7 | 24.5 15.2 10.7 10.1 | 0.7 0.1 3.9 0.4 |
| | The reaction mixture was heated at 123° C. for 6.0 hours. The remaining 18.0 hours were at room temperature | | | | | | | | | |
| 4 | 4.0 g 0.0091 mole 1.0 equiv. | NaOAc; 1.5 g 0.0182 mole 2.0 equiv. | 0.35 g 0.0023 mole 0.25 equiv. | DMA 2.5 | 55 | 4.0 6.0 | 32.4 32.4 | 21.7 21.5 | 36.8 36.4 | 6.0 5.6 |
| | The reaction mixture was heated at 55° C. for the entire 6.0 hour reaction time. | | | | | | | | | |
| 5 | 4.0 g 0.0091 mole 1.0 equiv. | NaOAc; 3.7 g 0.0455 mole 5.0 equiv. | 0.35 g 0.0023 mole 0.25 equiv. | DMA 2.5 | R.T. to 80 | 6.0 24.0 96.0 | 61.1 80.0 88.0 | 36.7 3.1 | 12.3 5.5 | |
| | Of the 96.00 hour reaction time a total of 24.0 hours was at 80° C. The remaining 72.0 hours were at room temperature. Workup of the reaction mixture yielded 3.4 grams. The 88.0% at 96.0 hours is a total of cis and trans. | | | | | | | | | |
| 6 | 5.0 g 0.0114 mole 1.0 equiv. | NaOAc; 4.7 g 0.057 mole 5.0 equiv. | 0.43 g 0.0028 mole 0.25 equiv. | DMA 2.5 | 85 | 2.0 16.5 20.0 404.0 | 44.2 74.0 79.1 80.4 | 1.9 2.9 2.5 3.6 | 52.2 20.6 16.4 13.5 | 1.0 0.9 0.4 0 |
| | The reaction mixture was heated at 85° C. for the entire 112.0 hour reaction time. | | | | | | | | | |
| 7 | 4.0 g 0.0091 mole 1.0 equiv. | NaOAc; 3.7 g 0.0455 mole 5.0 equiv. | 0.35 g 0.0023 mole 0.25 equiv. | DMA 2.5 | R.T to 123 | 3.0 6.0 24.0 | 47.1 52.0 52.3 | 24.3 24.2 24.4 | 17.9 12.4 12.4 | 0 0 0 |
| | The reaction mixture was heated at 123° C. for 6.0 hours. The remaining 18.0 hours were at room temperature. | | | | | | | | | |
| 8 | 4.0 g 0.0091 mole 1.0 equiv. | NaOAc; 3.7 g 0.0455 mole 5.0 equiv. | 0.35 g 0.0023 mole 0.25 equiv. | DMA 2.5 | 125 | 6.0 | 28.3 | 11.7 | | |
| | The reaction mixture was heated at 125° C. for the entire 6.0 hour reaction time. | | | | | | | | | |
| 9 | 4.0 g 0.0091 mole 1.0 equiv. | NaOAc; 0.75 g 0.0091 mole 1.0 equiv. | 0.35 g 0.0023 mole 0.25 equiv. | DMA 2.5 | 125–131 | 1.75 | 53.6 | 27.8 | 7.7 | |
| | CaO was omitted. The reaction mixture heated at 125–131° C. for 6.75 hours. | | | | | | | | | |
| 10 | 4.0 g 0.0091 mole 1.0 equiv. | NaOAc; 0.75 g 0.0091 mole 1.0 equiv. | 0.17 g 0.0011 mole 0.125 equiv. | DMA 2.5 | R.T. to 125 | 1.0 4.3 5.3 | 35.9 46.8 48.7 | 30.5 31.0 30.0 | 26.6 15.1 12.9 | 1.9 0.3 |
| | Of the 22.0 hour reaction time, a total of 4.7 hours was at 125° C. The remaining 17.3 hours were at room temperature. Workup of the reaction mixture yielded 2.9 g of product which was again subjected to dehydrohalogenation conditions as below. | | | | | | | | | |
| | 2.9 g | NaOAc; 0.75 g 0.0091 mole 2.0 equiv.(total) | 0.17 g 0.0011 mole 0.25 equiv.(total) | DMA 0.7 | 125 | 0.7 6.7 | 56.4 56.7 | 28.4 25.2 | 5.8 5.3 | |
| | The reaction mixture heated at 125° C. for 6.7 hours, cooled, then worked up. | | | | | | | | | |
| 11 | 4.0 g 0.0091 mole 1.0 equiv. | NaOAc; 0.75 g 0.0091 mole 1.0 equiv. | 0.17 g 0.0011 mole 0.125 equiv. | DMA 0.5 | R.T. to 125 | 1.0 3.25 31.5 | 22.5 25.1 36.2 | 25.8 27.4 30.8 | 38.3 36.3 24.1 | 9.0 6.7 1.3 |
| | Of the 31.5 hours reaction time, a total of 12 hours was at 125° C. The remaining 19.5 hours were at room temperature. | | | | | | | | | |
| 12 | 5.0 g 0.0114 mole 1.0 equiv. | NaOAc; 4.7 g 0.057 mole 5.0 equiv. | 0.43 g 0.0028 mole 0.25 equiv. | DMSO 2 | 80 | 1.0 16.0 88.0 | 34.4 68.5 86.2 | 1.6 2.7 2.0 | 61.9 25.6 3.2 | 1.7 1.1 0 |
| | The reaction was heated at 80° C. for the entire 88.0 hour reaction time. A 4% (area) acetylenic by-product formed. | | | | | | | | | |

TABLE 1-continued

Process for the Dehydrohalogenation of 3-(2,2-Dichloro-3,3,3-trifluoropropyl)-2,2-dimethylcyclopropanecarboxylic Acid Esters

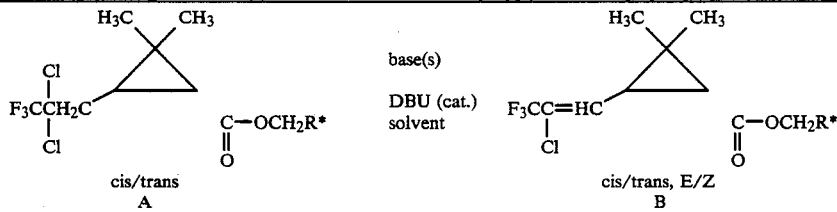

cis/trans
A
→ base(s), DBU (cat.), solvent →
cis/trans, E/Z
B

| Run | Propyl Ester (A);[1] Weight/Moles/ Equiv. | Base(s) Weight/Moles/Mol Equiv. | DBU[2]; Weight/Moles/ Mol Equiv. | Solvent; ml/gram of Propyl Ester | Reaction Temperature (°C.) | Time into Reaction (hr) | GC Analysis of the Reaction Mixture (area %) | | | |
|---|---|---|---|---|---|---|---|---|---|---|
| | | | | | | | 1-Propenyl Ester (B)[1] | | Propyl Ester (A) | |
| | | | | | | | cis | trans | cis | trans |
| 13 | 4.0 g 0.0091 mole 1.0 equiv. | NaOAc; 3.0 g 0.0364 mole 4.0 equiv. | CaO; 0.6 g 0.0109 mole 1.2 equiv. | 0.35 g 0.0023 mole 0.25 equiv. | DMA 2.5 | 50–55 | 1.0 4.0 6.0 22.5 | 21.0 42.5 49.0 60.9 | 16.7 27.3 28.6 23.0 | 39.3 19.8 14.1 6.9 | 17.9 5.3 2.8 0.2 |

The reaction mixture was heated at 50–55° C. for the entire 22.5 hour reaction time.

| 14 | 10.0 g 0.023 mole 1.0 equiv. | NaOAc; 1.9 g 0.023 mole 1.0 equiv. | CaO; 0.64 g 0.011 mole 0.5 equiv. | 0.87 g 0.006 mole 0.25 equiv. | DMA 1 | 70 | 4.0 7.0 23.0 24.5 28.0 after workup | 41.7 54.2 60.9 61.3 61.9 61.8 | 29.0 31.2 30.7 30.3 30.1 29.7 | 22.5 10.3 4.5 4.3 4.1 4.2 | 4.8 0.9 |

After heating at 70° C. for 23.0 hours an additional 0.1 equiv. of DBU was added (total is 0.35 eq). The reaction mixture was heated at 70° C. for the entire 28.0 hour reaction time. Workup of the reaction mixture yielded 7.4 g.

| 15 | 10.0 g 0.023 mole 1.0 equiv. | NaOAc; 1.9 g 0.023 mole 1.0 equiv. | CaO; 0.64 g 0.011 mole 0.5 equiv. | 0.87 g 0.006 mole 0.25 mole | DMA 2.5 | 70 | 4.0 7.0 23.0 | 44.0 55.6 61.5 | 29.8 30.9 29.9 | 20.5 10.0 4.5 | 3.5 0.6 |

The reaction mixture was heated at 70° C. for the entire 23.0 hour reaction time.

| 16 | 4.0 g 0.0091 mole 1.0 equiv. | NaOAc; 2.2 g 0.0273 mole 3.0 equiv. | CaO; 0.30 g 0.054 mole 0.6 equiv. | 0.18 g 0.00115 mole 0.125 mole | DMA 2.5 | R.T. to 71–75 | 3.5 19.5 21.5 25.5 | 34.2 38.4 52.6 60.9 | 25.8 27.6 30.2 28.2 | 28.0 24.9 10.5 4.5 | 6.8 5.1 1.0 0 | wt % after workup 60.2 26.4
total cis/trans = 86.6
total cis = 60.2/86.6 = 69.5%
total trans = 26.4/86.6 = 30.5%

The reaction mixture was heated at 72–75° C. for 3.5 hours, stood at room temperature for 16 hours, then an additional 0.125 equiv. of DBU added (total is 0.25 eq). Heating was continued for an additional 6.5 hours. The reaction mixture yielded 2.2 g after workup.

| 17 | 4.0 g 0.0091 mole 1.0 equiv. | NaOAc; 1.5 g 0.0182 mole 2.0 equiv. | CaO; 0.25 g 0.0045 mole 0.5 equiv. | 0.42 g 0.0027 mole 0.30 equiv. | DMA 2.5 | R.T. to 73–80 | 2.0 4.0 22.0 | 55.2 58.5 56.2 | 32.0 30.1 27.6 | 7.7 4.7 4.4 | 0.3 |

Of the 22.0 hour reaction time, a total of 6.0 hours was at 73–80° C. The remaining 16.0 hours were at room temperature.

| 18 | 4.0 g 0.0091 mole 1.0 equiv. | NaOAc; 1.5 g 0.0182 mole 2.0 equiv. | CaO; 0.25 g 0.0045 mole 0.5 equiv. | 0.07 g 0.0004 mole 0.06 equiv. | DMA 2.5 | R.T. R.T. to 70.0 75–80 | 0 3.5 5.5 38.0 72.25 77.25 94.0 | 3.3 24.5 31.7 29.2 51.6 55.5 55.8 | 3.7 24.8 28.8 22.1 31.4 31.5 30.2 | 54.9 35.0 29.7 3.1 10.9 7.5 7.4 | 32.4 10.0 5.6 0.8 |

Of the 94.0 hour reaction time, a total of 12.75 hours was at 75–80° C. The remaining 81.25 hours were at room temperature. At 70.75 hours into the reaction a 1.0 eq. of DBU was added (total is 1.06 eq).

| 19 | 4.0 g 0.0091 mole 1.0 equiv. | NaOAc; 1.5 g 0.0182 mole 2.0 equiv. | CaO; 0.25 g 0.0045 mole 0.5 equiv. | 0.14 g 0.0009 mole 0.1 equiv. | DMA 2.5 | R.T. R.T. to 75–82 | 0 1.75 5.75 22.25 | 2.8 28.1 49.3 54.2 | 3.9 25.8 31.2 31.9 | 55.7 32.5 11.7 8.3 | 32.8 9.0 1.0 |

Of the 22.25 hour reaction time, a total of 6.5 hours was at 75–82° C. The remaining 15.75 hours were at room temperature. Reaction mixture yielded 2.3 g after workup.

| 20 | 20.0 g 0.046 mole 1.0 equiv. | NaOAc; 18.7 g 0.228 mole 5.0 equiv. | CaO; 3.1 0.055 mole 1.2 equiv. | 1.7 g 0.011 mole 0.25 equiv. | DMA 2.5 | 65–85 | 1.0 2.0 4.0 6.0 | 30.3 48.1 57.1 58.3 | 23.7 30.1 28.5 19.2 | 32.3 14.7 7.0 6.6 | 11.0 2.0 1.7 1.5 |

The reaction mixture was heated at 64° C. for the first hour, then at 85° C. for the remaining 5.0 hours. Some by-products formed (7.2%) (area).

| 21 | 4.0 g 0.0091 mole 1.0 equiv. | NaOAc; 1.5 g 0.0182 mole 2.0 equiv. | CaO; 0.25 g 0.0045 mole 0.5 equiv. | 0.17 g 0.0011 mole 0.123 equiv. | DMA 2.5 | 84–85 | 2.0 3.0 | 54.2 59.5 | 23.8 23.6 | 17.4 11.3 | 1.1 0.4 |

The reaction mixture was worked up after heating at 84–85° C. for three hours. The product was again subjected to dehydrohalogenation conditions, as below. The 3.1 g sample (0.0071 mole-1.0 eq) was treated as if it was 100% propyl compound, as follows:

| | | NaOAc; | CaO; | 0.07 g | DMA | 75–78 | 0.75 | 63.2 | 23.2 | 8.5 | |

TABLE 1-continued

Process for the Dehydrohalogenation of 3-(2,2-Dichloro-3,3,3-trifluoropropyl)-2,2-dimethylcyclopropanecarboxylic Acid Esters

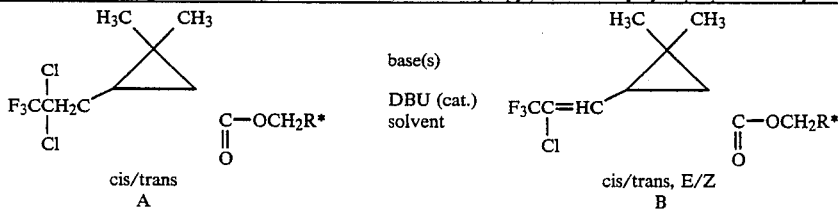

| Run | Propyl Ester (A);[1] Weight/Moles/ Equiv. | Base(s) Weight/Moles/Mol Equiv. | DBU[2]; Weight/Moles/ Mol Equiv. | Solvent; ml/gram of Propyl Ester | Reaction Temperature (°C.) | Time into Reaction (hr) | 1-Propenyl Ester (B)[1] cis | trans | Propyl Ester (A) cis | trans |
|---|---|---|---|---|---|---|---|---|---|---|
|  | 1.2 g 0.014 mole 2.0 equiv. | 0.19 g 0.0034 mole 0.5 equiv. | 0.0004 mole 0.06 equiv. | 2.5 |  | 16.5 | 67.2 | 14.4 | 4.7 |  |

The reaction mixture was heated at 75–78° C. for the entire 16.5 hour reaction time.

| 22 | 4.0 g 0.0091 mole 1.0 equiv. | NaOAc; 1.5 g 0.0182 mole 2.0 equiv. | CaO; 0.25 g 0.0045 mole 0.5 equiv. | 0.18 g 0.0011 mole 0.125 equiv. | DMA 2.5 | 79 | 4.0 6.0 24.0 after workup | 28.1 41.3 69.3 59.3 | 25.4 29.3 30.9 29.2 | 33.3 20.0 5.4 4.7 | 9.0 3.6 |

An additional 0.125 eq. of DBU was added (total is 0.25 eq) 5.0 hours into the reaction time. Of the 24.0 hours reaction time, a total of 23.0 hours was at 79° C. Workup of the reaction mixture yielded 2.8 grams.

| 23 | 83.0 g 0.189 mole 1.0 equiv. | NaOAc; 23.3 g 0.284 mole 1.5 equiv. | CaO; 4.25 g 0.076 mole 0.4 equiv. | 7.2 g 0.047 mole 0.25 equiv. | DMA 2.5 | R.T. to 78–80 | 2.5 8.0 72.0 72.0 | 63.0 76.3 87.0 56.0 | 4.8 4.6 4.8 30.8 | 29.0(SP2100) 15.0 4.0 (OV225) |  |

Large scale reaction: of the 72.0 hours reaction time, a total of 27.0 hours was at 78–80° C. The reaction exothermed to 105° C. at 0.3 hour into the initial heating. The remaining 45.0 hours were at room temperature. Workup of the reaction mixture yielded 70.0 g.

| 24 | 4.0 g 0.0091 mole 1.0 equiv. | NaOAc; 1.5 g 0.0182 mole 2.0 equiv. | CaO; 0.25 g 0.0046 mole 0.5 equiv. | 0.35 g 0.0023 mole 0.25 equiv. | DMA 2.5 | R.T. to 80 | 30.25 30.25 | 90.7 58.0 | 4.7 30.0 | 1.2(SP2100) 4.6(OV225) |  |

Of the 30.25 hours reaction time, a total of 11.5 hours was at 80° C. The remaining 18.75 hours were at room temperature.

| 25 | 4.0 g 0.0091 mole 1.0 equiv. | NaOAc; 1.5 g 0.0182 mole 2.0 equiv. | CaO; 0.25 g 0.0046 mole 0.5 equiv. | 0.14 g 0.00091 mole 0.1 equiv. | DMA 2.5 | R.T. to 80 | 50.5 50.5 | 88.4 61.5 | 4.3 27.4 | 3.7(SP2100) 5.7(OV225) |  |

Of the 50.5 hours reaction time, a total of 15.75 hours was at 80° C. The remaining 34.5 hours were at room temperature.

| 26 | 4.0 g 0.0091 mole 1.0 equiv. | NaOAc; 0.75 g 0.0091 mole 1.0 equiv. | CaO; 0.20 g 0.0036 mole 0.4 equiv. | 0.14 g 0.00091 mole 0.1 equiv. | DMA 2.5 | R.T. to 80 | 3.75 6.0 23.0 30.0 48.0 | 25.8 29.1 32.4 41.6 45.0 | 25.4 27.3 29.2 30.6 31.7 | 34.8 30.2 28.3 17.0 15.8 | 9.3 6.0 5.1 1.5 1.2 |

Of the 48.0 hours reaction time, a total of 16 hours was at 60–80° C. The remaining 32.0 hours were at room temperature.

| 27 | 4.0 g 0.0091 mole 1.0 equiv. | NaOAc; 0.75 g 0.0091 mole 1.0 equiv. | CaO; 0.13 g 0.0023 mole 0.25 equiv. | 0.35 g 0.0023 mole 0.25 equiv. | DMA 2.5 | R.T. to 80 | 3.75 22.25 24.25 27.75 44.5 | 48.4 51.2 52.4 59.5 60.4 | 31.9 32.0 32.0 29.7 28.2 | 12.8 10.5 9.1 4.8 4.4 | 1.1 |

Of the 44.5 hour reaction time, a total of 11.25 hours was at 80° C. The remaining 33.25 hours were at room temperature. After a total reaction time of 24.25 hours an additional 1.0 eq of NaOAc (total is 2.0 eq) and 0.25 eq of CaO (total is 0.5 eq) were added.

| 28 | 1.2 g 0.0027 mole 1.0 equiv. | NaOAc; 0.45 g 0.0054 mole 2.0 equiv. | CaO; 0.08 g 0.0014 mole 0.5 equiv. | 0.11 g 0.0007 mole 0.25 equiv. | DMA 2.5 | 80 | 4.0 5.0 22.5 30.5 | 53.4 54.3 55.8 56.7 | 33.7 33.7 32.5 32.6 | 6.4 5.9 5.0 4.6 |  |

An additional 0.07 eq of DBU was added (total is 0.32 eq) after 23 hours. Reaction mixture heated at 80° C. for the entire 30.5 hour reaction time.

| 29 | 4.0 g 0.0091 mole 1.0 equiv. | NaOAc; 0.75 g 0.0091 mole 1.0 equiv. | CaO; 0.26 g 0.0046 mole 0.4 equiv. | 0.35 g 0.0023 mole 0.25 equiv. | DMA 2.5 | R.T. to 80 | 6.0 96.0 | 57.5 57.2 | 30.4 30.0 | 6.3 5.8 | 0.4 0.2 |

Of the 96.0 hours reaction time, a total of 6.0 hours was at 80° C. The remaining 90.0 hours were at room temperature. Workup of the reaction mixture yielded 3.1 g.

| 30 | 12.0 g 0.027 mole 1.0 equiv. | NaOAc; 4.5 g 0.055 mole 2.0 equiv. | CaO; 0.76 g 0.014 mole 0.5 equiv. | 1.1 g 0.007 mole 0.25 equiv. | DMA 2.5 | 80 area % after workup wt % after workup total cis/trans = 86.7 total cis = 56.3/86.7 = 64.9% total trans = 30.4/86.7 = 35.1% | 20.5 | 51.0 56.7 56.3 | 30.0 28.6 30.4 | 5.3 6.2 | 0.5 0.2 |

The reaction mixture was heated at 80° C. for the entire 20.5 hours reaction time. Workup of the reaction mixture yielded 9.5 g (79%).

| 31 | 5.0 g 0.0114 mole | NaOAc; 1.9 g | CaO; 0.26 g | 0.43 g 0.0028 mole | DMA 2.5 | 80 | 4.5 18.0 | 49.6 60.2 | 28.8 30.5 | 11.8 6.1 | 1.1 0.2 |

TABLE 1-continued
Process for the Dehydrohalogenation of 3-(2,2-Dichloro-3,3,3-trifluoropropyl)-2,2-dimethylcyclopropanecarboxylic Acid Esters $$\underset{\underset{A}{\text{cis/trans}}}{\overset{\overset{H_3C\quad CH_3}{\diagup\!\!\!\diagdown}}{\underset{\underset{Cl}{|}}{\overset{\overset{Cl}{|}}{F_3CCH_2C}}\quad\underset{\overset{\|}{O}}{C-OCH_2R^*}}} \quad\xrightarrow[\text{solvent}]{\text{base(s)}\atop\text{DBU (cat.)}}\quad \underset{\underset{B}{\text{cis/trans, E/Z}}}{\overset{\overset{H_3C\quad CH_3}{\diagup\!\!\!\diagdown}}{\underset{\overset{Cl}{|}}{F_3CC=HC}\quad\underset{\overset{\|}{O}}{C-OCH_2R^*}}}$$

| Run | Propyl Ester (A);[1] Weight/Moles/ Mol Equiv. | Base(s) Weight/Moles/Mol Equiv. | DBU[2]; Weight/Moles/ Mol Equiv. | Solvent; ml/gram of Propyl Ester | Reaction Temperature (°C.) | Time into Reaction (hr) | GC Analysis of the Reaction Mixture (area %) | | | |
|---|---|---|---|---|---|---|---|---|---|---|
| | | | | | | | 1-Propenyl Ester (B)[1] | | Propyl Ester (A) | |
| | | | | | | | cis | trans | cis | trans |
| | 1.0 equiv. | 0.0228 mole 2.0 equiv. | 0.0046 mole 0.4 equiv. | 0.25 equiv. | | 20.0 | 54.8 | 28.4 | 6.8 | |
| | | | | | | 21.5 | 55.7 | 28.7 | 6.1 | |

The reaction mixture was heated at 80° C. for the entire 21.5 hours reaction time. An additional 0.5 equiv. of DBU (total is 0.30 eq) and an additional 1.0 equiv. of NaOAc (total is 3.0 eq) in 2 ml of DMA were added at 18.0 hours and 20.0 hours, respectively, into the reaction time.

| 32 | 5.0 g 0.0114 mole 1.0 equiv. | NaOAc; 2.8 g 0.0341 mole 3.0 equiv. | CaO; 0.38 g 0.0067 mole 0.6 equiv. | 0.43 g 0.028 mole 0.25 equiv. | DMA 2.5 | R.T. to 80 | 3.0 6.0 22.0 | 56.7 55.8 59.8 | 31.3 27.4 27.0 | 9.7 6.6 5.4 | 0.1 0 0 |

Of the 22.0 hours reaction time a total of 6.0 hours was at 80° C. The remaining 16.0 hours were at room temperature. Some byproducts formed (3.2%).

| 33 | 4.0 g 0.0091 mole 1.0 equiv. | NaOAc; 0.75 g 0.0091 mole 1.0 equiv. | CaO; 0.13 g 0.0023 mole 0.25 equiv. | 0.35 g 0.0023 mole 0.25 equiv. | DMA 2.5 | R.T. to 80 | 2.25 5.25 22.25 24.5 29.5 | 47.7 50.9 52.2 55.0 58.6 | 31.4 31.9 31.4 31.6 29.5 | 13.6 10.8 9.8 7.0 4.7 | 1.1 0.4 0.3 |

Of the 29.5 hours reaction time, a total of 12.25 hours was at 80° C. The remaining 17.25 hours were at room temperature. At 22.25 hours into the reaction time an additional 0.25 equiv. of CaO (total is 0.5 eq) was added. At this same time NaHCO3 (0.98 eq) was mistakenly added rather than the intended 1.0 eq of NaOAc.

| 34 | 377.0 g 0.86 mole 1.0 eqiv. | NaOAc; 105.8 g 1.29 moles 1.5 equiv. | CaO; 24.1 g 0.43 mole 0.5 equiv. | 32.7 g 0.215 mole 0.25 equiv. | DMA 2.5 | R.T. R.T. to 80 after workup | 0 2.0 4.0 23.0 | 5.9 49.1 53.5 54.3 53.9 | 9.4 29.2 27.0 26.1 26.2 | 47.3 10.2 7.4 6.2 6.6 | 24.4 97 |

Large scale reaction. The reaction exothermed to 98° C. at 0.3 hour into initial heating. Of the 23.0 hour reaction time, a total of 6.5 hours was at 80° C. The remaining 16.5 hours were at toom temperature. Workup of the reaction mixture yielded 239.0 g (69% yield).

| 35 | 4.0 g 0.0091 mole 1.0 equiv. | NaOAc; 3.0 g 0.0364 mole 4.0 equiv. | CaO; 0.6 g 0.0109 mole 1.2 equiv. | 0.35 g 0.0023 mole 0.25 equiv. | DMA 2.5 | 80–84 | 1.5 3.0 5.5 22.0 | 42.7 49.8 51.5 51.8 | 21.4 19.0 10.2 8.5 | 25.5 20.5 19.8 19.4 | 5.0 2.7 2.0 1.8 |

At 3.5 hours into the reaction time 0.2 equiv. of CaO (total is 1.4 eq) was added. The reaction mixture was heated at 80–84° C. a total of 5.5 hours, then stirred at room temperature for 16.5 hours.

| 36 | 4.0 g 0.0091 mole 1.0 equiv. | NaOAc; 4.7 g 0.0573 mole 6.3 equiv. | CaO; 0.62 g 0.0111 mole 1.2 equiv. | 0.43 g 0.0028 mole 0.31 equiv. | DMA 2.5 | 80–85 | 2.0 | 86.0 | 5.0 | 2.6 | |

NaOAc/CaO/DBU were used together. The reaction mixture was heated at 80–85° C. for the entire 2.0 hour reaction time.

| 37 | 4.0 g 0.0091 mole 1.0 equiv. | NaOAc; 0.75 g 0.0091 mole 1.0 equiv. | CaO; 0.20 g 0.0036 mole 0.4 equiv. | 0.35 g 0.0023 mole 0.25 equiv. | DMA 2.5 | R.T. to 80–85 | 20.3 22.8 24.8 | 82.9 86.6 79.0 | 4.8 4.9 4.6 | 0.6 5.7 5.0 | |

Of the 24.8 hours reaction time, a total of 15.5 hours were at 80–85° C. The remaining 9.3 hours were at room temperature. At 23.8 hours into the reaction time an additional 0.1 equiv. of NaOAc (total is 1.1 equiv) was added. GC analysis done using an SP2100 column.

| 38 | 4.0 g 0.0091 mole 1.0 equiv. | NaOAc; 3.0 g 0.0364 mole 4.0 equiv. | CaO; 0.6 g 0.0109 mole 1.2 equiv. | 03.5 g 0.0023 mole 0.25 equiv. | DMA 2.5 | R.T. to 80 | 1.0 64.5 | 42.2 56.7 | 28.0 29.8 | 20.2 7.0 | 3.9 0.7 |

The reaction mixture was heated at 80–87° C. for 1.25 hours then stirred at room temperature for the remaining 62.25 hours.

| 39 | 43.9 g 0.10 mole 1.0 equiv. | NaOAc; 12.3 g 0.15 mole 1.5 equiv. | CaO; 2.2 g 0.04 mole 0.4 equiv. | 3.8 g 0.025 mole 0.25 equiv. | DMA 2.3 | R.T. to 70–90 | 4.0 28.0 48.3 | 70% conversion (derived from GC area percents) 88% conversion 91.5% conversion | | | |

Of the 52.0 hours reaction time a total of 32.0 hours was at 70–90° C. The remaining 20.0 hours were at room temperature. This was a large scale reaction which yielded 36.4 g of product (83.3% yield) after workup.

| 40 | 771.5 g 1.76 moles 1.0 equiv. | NaOAc; 246.0 g 3.0 mole 1.7 equiv. | CaO; 44.0 g 0.78 mole 0.45 equiv. | 76.0 g 0.50 mole 0.28 equiv. | DMA 2.6 | 82–93 | 1.75 23.5 | 78.7% conversion 93.2% conversion | | | |

The reaction mixture was heated at 82–93° C. for 22.25 hours of the total 23.5 hours reaction time. This run represented a large scale reaction under preferred conditions. The yield of product was 666.4 grams (94.0% yield) after workup.

TABLE 1-continued

Process for the Dehydrohalogenation of 3-(2,2-Dichloro-3,3,3-trifluoropropyl)-2,2-dimethylcyclopropanecarboxylic Acid Esters $$\underset{\substack{\text{cis/trans} \\ A}}{\text{F}_3\text{CCH}_2\text{C}(\text{Cl})_2-\overset{\text{H}_3\text{C}\quad\text{CH}_3}{\triangle}-\text{C}(=\text{O})-\text{OCH}_2\text{R}^*} \quad \xrightarrow[\text{solvent}]{\substack{\text{base(s)} \\ \text{DBU (cat.)}}} \quad \underset{\substack{\text{cis/trans, E/Z} \\ B}}{\text{F}_3\text{CC}=\text{CH}(\text{Cl})-\overset{\text{H}_3\text{C}\quad\text{CH}_3}{\triangle}-\text{C}(=\text{O})-\text{OCH}_2\text{R}^*}$$

| Run | Propyl Ester (A);[1] Weight/Moles/ Equiv. | Base(s) Weight/Moles/Mol Equiv. | DBU[2]; Weight/Moles/ Mol Equiv. | Solvent; ml/gram of Propyl Ester | Reaction Temperature (°C.) | Time into Reaction (hr) | GC Analysis of the Reaction Mixture (area %) | | | |
|---|---|---|---|---|---|---|---|---|---|---|
| | | | | | | | 1-Propenyl Ester (B)[1] | | Propyl Ester (A) | |
| | | | | | | | cis | trans | cis | trans |
| 41 | 4.0 g 0.0091 mole 1.0 equiv. | NaOAc; 3.0 g 0.0364 mole 4.0 equiv. | CaO; 0.6 g 0.0109 mole 1.2 equiv. | 0.35 g 0.0023 mole 0.25 equiv. | DMA 2.5 | 125 | 2.5 18.0 | 53.4 61.3 | 3.4 1.0 | 12.5 8.0 | 0.2 1.8 |
| | The reaction mixture was heated at 125° C. for the entire 18.0 hours reaction time. | | | | | | | | | | |
| 42 | 4.0 g 0.0091 mole 1.0 equiv. | NaOAc; 1.5 g 0.0182 mole 2.0 equiv. | CaO; 0.20 g 0.0036 mole 0.4 equiv. | 0.35 g 0.0023 mole 0.25 equiv. | DMA 2.5 | R.T. to | 1.25 123.25 | 56.8 52.0 | 28.1 21.7 | 5.3 4.9 | |
| | Of the 23.25 hours reaction time, a total of 7.75 hours was at 125° C., the remaining 15.5 hours were at room temperature. | | | | | | | | | | |
| 43 | 4.0 g 0.0091 mole 1.0 equiv. | NaOAc; 1.5 g 0.0182 mole 2.0 equiv. | CaO; 0.20 g 0.0036 mole 0.4 equiv. | 0.35 g 0.0023 mole 0.25 equiv. | DMA 2.5 | 125 | 2.0 2.5 | 85.6 86.4 | 5.4 5.1 | 0.6 0.01 | |
| | The reaction mixture was heated at 125° C. for the entire 6.5 hours reaction time. GC analysis was done using an SP2100 column. | | | | | | | | | | |
| 44 | 4.0 g 0.0091 mole 1.0 equiv. | NaOAc; 0.75 g 0.0091 mole 1.0 equiv. | CaO; 0.13 g 0.0023 mole 0.25 equiv. | 0.35 g 0.0023 mole 0.25 equiv. | DMA 2.5 | 125–132 | 0.75 1.75 | 54.2 55.3 | 28.9 26.8 | 7.6 5.2 | |
| | The reaction mixture heated at 125–132° C. for 6.5 hours. | | | | | | | | | | |
| 45 | 4.0 g 0.0091 mole 1.0 equiv. | NaOAc; 4.68 g 0.0571 mole 6.3 equiv. | MgO; 0.44 g 0.0109 mole 1.2 equiv. | 0.43 g 0.0028 mole 0.3 equiv. | DMA 2.5 | 80–85 | 4.0 22.0 | 83.0 94.0 | 4.3 2.5 | 94. 1.0 | |
| | The reaction mixture was heated at 80–85° C. for the entire 22.0 hours reaction time. MgO replaced CaO in this experiment. | | | | | | | | | | |
| 46 | 4.0 g 0.0091 mole 1.0 equiv. | NaOAc; 2.24 g 0.0273 mole 3.0 equiv. | CaO; 0.30 g 0.0054 mole 0.6 equiv. | none | DMA 2.5 | 78–80 | 16.0 | 16.0 | 6.0 | 46.0 | 10.0 |
| | The reaction mixture was heated at 78–80° C. for the entire 16.0 hours reaction time. DBU was omitted. | | | | | | | | | | |
| 47 | 4.0 g 0.0091 mole 1.0 equiv. | NaOAc; 2.5 g 0.0182 mole 2.0 equiv. | CaO; 0.26 g 0.0046 mole 0.5 equiv. | 0.35 g 0.0023 mole 0.25 equiv. | DMSO 2.5 | 80 | 5.0 23.0 | 57.7 55.9 | 27.8 25.7 | 6.9 6.6 | 0 0 |
| | Of the 23.0 hours reaction time, a total of 8.0 hours was at 80° C. The remaining 15.0 hours were at room temperature. | | | | | | | | | | |
| 48 | 10.0 g 0.0228 mole 1.0 equiv. | CaO; 0.64 g 0.0114 mole 0.5 equiv. | | 0.87 g 0.0057 mole 0.25 equiv. | DMA 2.5 | 50 | 8.0 23.0 | 14.2 46.7 | 12.6 28.9 | 45.9 17.4 | 22.5 4.4 |
| | The reaction mixture was heated at 50° C. for the entire 23.0 hour reaction time. | | | | | | | | | | |
| 49 | 4.0 g 0.0091 mole 1.0 equiv. | CaO; 1.0 g 0.0182 mole 2.0 equiv. | | 0.35 g 0.0023 mole 0.25 equiv. | DMA 2.5 | 55 | 4.0 6.0 | 13.7 13.9 | 12.4 12.5 | 34.6 32.4 | 18.2 16.4 |
| | The reaction mixture was heated at 55° C. for the entire 6.0 hour reaction time. | | | | | | | | | | |
| 50 | 10.0 g 0.0228 mole 1.0 equiv. | CaO; 0.77 g 0.0137 mole 0.6 equiv. | | 0.87 g 0.0057 mole 0.25 equiv. | DMA 2.5 | 80 | 3.0 20.0 | 54.7 55.9 | 28.0 27.7 | 9.1 7.0 | 1.2 0 |
| | The reaction mixture was heated at 80° C. for the entire 20.0 hour reaction time. | | | | | | | | | | |
| 51 | 10.0 g 0.0228 mole 1.0 equiv. | CaO; 0.64 g 0.0114 mole 0.5 equiv. | | 0.87 g 0.00257 mole 0.25 equiv. | DMA 1.0 | 80 | 7.5 20.0 | 53.9 52.4 | 28.6 27.9 | 9.4 8.8 | |
| | The reaction mixture was heated at 80° C. for the entire 20.0 hour reaction time. | | | | | | | | | | |
| 52 | 10.0 g 0.0228 mole 1.0 equiv. | CaO; 0.51 g 0.0091 mole 0.4 equiv. | | 0.87 g 0.0057 mole 0.25 equiv. | DMA 2.5 | 80–85 | 4.0 7.5 20.5 | 48.2 52.8 54.8 | 29.7 26.2 27.5 | 15.9 6.9 6.9 | 2.8 0 0 |
| | An additional 0.2 equiv. (total is 0.6 eq) of CaO was added 4.0 hours into the reaction time. The reaction was heated at 80–85° C. for the entire 20.5 hour reaction time. | | | | | | | | | | |
| 53 | 4.0 g 0.0091 mole | MgO; 0.73 g | | 0.35 g 0.0023 mole | DMA 2.5 | 55 | 4.0 6.0 | 18.1 18.6 | 13.0 11.8 | 49.4 45.3 | 15.3 14.1 |

TABLE 1-continued

Process for the Dehydrohalogenation of 3-(2,2-Dichloro-3,3,3-trifluoropropyl)-2,2-dimethylcyclopropanecarboxylic Acid Esters $$\underset{\text{cis/trans}}{\underset{A}{\text{F}_3\text{CCH}_2\text{C}(\text{Cl})_2\text{—}\bigtriangleup(\text{CH}_3)_2\text{—C(=O)OCH}_2\text{R*}}} \quad \xrightarrow[\text{solvent}]{\text{base(s)} \atop \text{DBU (cat.)}} \quad \underset{\text{cis/trans, E/Z}}{\underset{B}{\text{F}_3\text{CC=HC(Cl)}\text{—}\bigtriangleup(\text{CH}_3)_2\text{—C(=O)OCH}_2\text{R*}}}$$

| Run | Propyl Ester (A);[1] Weight/Moles/ Equiv. | Base(s) Weight/Moles/Mol Equiv. | DBU[2]; Weight/Moles/ Mol Equiv. | Solvent; ml/gram of Propyl Ester | Reaction Temperature (°C.) | Time into Reaction (hr) | GC Analysis of the Reaction Mixture (area %) | | | |
|---|---|---|---|---|---|---|---|---|---|---|
| | | | | | | | 1-Propenyl Ester (B)[1] | | Propyl Ester (A) | |
| | | | | | | | cis | trans | cis | trans |
| | 1.0 equiv. | 0.0182 mole 2.0 equiv. | 0.25 equiv. | | | | | | | |
| | The reaction mixture was heated at 55° C. for the entire 6.0 hour reaction time. | | | | | | | | | |
| 54 | 4.0 0.0091 mole 1.0 equiv. | MgO; 1.8 g 0.0455 mole 5.0 equiv. | 0.35 g 0.0023 mole 0.25 equiv. | DMA 2.5 | 125 | 4.0 6.0 | 27.2 28.2 | 24.7 23.0 | 18.5 17.3 | 7.8 6.5 |
| | The reaction mixture was heated at 125° C. for the entire 6.0 hour reaction time. | | | | | | | | | |
| 55 | 4.0 g 0.0091 mole 1.0 equiv. | KHCO3; 1.9 g 0.0183 mole 2.0 equiv. | 0.35 g 0.0023 mole 0.25 equiv. | DMA 2.5 | 55–125 | 4.0 6.0 | 63.8 73.3 | 15.0 10.2 | 7.4 4.4 | 1.4 |
| | The reaction mixture was heated at 56° C. for 2 hours, then at 125° C. for the remainder of the 6.0 hour reaction time. | | | | | | | | | |
| 56 | 25.0 g 0.085 mole 1.0 equiv. | KHCO3; 35.0 g 0.349 mole 4.1 equiv. | 3.25 g 0.021 mole 0.25 equiv. | DMa 2.0 | R.T. to 80 | 0 2.0 4.0 7.0 | 2.1(c/t total) 47.8 60.0 67.1 | 13.4 10.5 14.5 | 76.2 33.9 27.9 18.1 | 21.3 4.7 1.5 0.1 |
| | The reaction mixture was heated at 80° C. for 21 hours. Workup of the reaction mixture yielded 19.7 grams of product (89.8% yield) which was 72.8% cis-26.9%trans. | | | | | | | | | |
| 57 | 10.0 g 0.0228 mole 1.0 equiv. | NaHCO3; 3.84 g 0.0456 mole 2.0 equiv. | 0.43 g 0.0028 mole 0.125 equiv. | DMA 2.3 | 80 | 4.0 6.5 22.0 | 31.2 47.0 52.3 | 23.7 29.9 28.7 | 32.8 17.3 8.8 | 10.8 3.6 |
| | The reaction mixture was heated at 80° C. for the entire 22.0 hour reaction time. After heating 4.0 hours an additional 2.0 equiv. (total is 4.0 eq) of NaHCO3 and 0.125 equiv. (total is 0.25 eq) of DBU in 2 ml of DMA (total is 2.5 mL/g) were added to the reaction mixture. | | | | | | | | | |
| 58 | 4.0 g 0.0091 mole 1.0 equiv. | NaHCO3; 1.50 g 0.0182 mole 2.0 equiv. | 0.35 g 0.0023 mole 0.25 equiv. | DMA 2.5 | R.T. to 80 | 3.0 5.0 14 days 14 days | 65.0 78.0 90.8 58.1 | 3.4 4.0 4.5 31.5 | 26.0(SP2100) 15.2 1.2 4.3(OV225) | |
| | The reaction mixture was heated at 80° C. for 24.0 hours then stood at room temperature for 13 days. | | | | | | | | | |
| 59 | 3.5 g 0.008 mole 1.0 equiv. | K2CO3; 2.2 g 0.016 mole 2.0 equiv. | 0.12 g 0.0008 mole 0.1 equiv. | DMA 1.4 | R.T. | 65.0 70.0 89.0 103.0 | 68.7 71.4 80.7 88.1 | 9.0 8.9 8.7 6.8 | 18.3 15.8 10.7 3.9 | 2.5 2.8 |
| | The reaction mixture was stirred at room temperature for the entire 103.0 hour reaction time. | | | | | | | | | |
| 60 | 43.8 g 0.10 mole 1.0 equiv. | K2CO3; 69.0 g 0.50 mole 5.0 equiv. | 3.95 g 0.025 mole 0.25 equiv. | DMA 1.0 | R.T. to 45–55 | 7.5 30.5 121.5 after workup wt % after workup total cis/trans = 83.3 total cis = 63.6% total trans = 36.5% | 31.4 28.0 51.5 51.7 53.0 | 12.7 9.1 32.0 30.0 30.3 | 26.3 30.4 6.8 7.0 | 23.9 28.1 0.8 0.2 |
| | Of the 167.0 hour reaction time, a total of 46.0 hours was at 45–55° C. The remaining 121.0 hours were at room temperature. An additional 2.0 equiv. (total is 7.0 eq) of K2CO3 was added 73.0 hours into the reaction time. Workup of the reaction mixture yielded 23.0 g (yield is 57%) of oil (loss because of sampling not accounted for). | | | | | | | | | |
| 61 | 10.3 g 0.0234 mole 1.0 equiv. | K2CO3 6.5 g 0.0468 mole 2.0 equiv. | 0.89 g 0.0058 mole 0.25 equiv. | DMA 1.2 | R.T. to 48–51 | 3.0 7.0 79.0 wt % after workup total cis/trans = 91.4 total cis = 61.7% total trans = 38.3% | 16.6 19.0 55.0 56.4 | 23.9 30.4 34.0 35.0 | 27.7 18.7 4.0 | 21.3 9.0 |
| | Of the 79.0 hour reaction time, a total of 7.0 hours was at 48.51° C. The remaining 72.0 hours were at room temperature. Workup of the reaction mixture yielded 6.9 g (yield is 73%). | | | | | | | | | |
| 62 | 5.0 g 0.0114 mole 1.0 equiv. | K2CO3; 3.2 g 0.0228 mole 2.0 equiv. | 0.43 g 0.0029 mole 0.25 equiv. | DMA 3.0 | R.T. to 55 | 1.0 2.0 4.0 6.0 8.0 | 20.6 42.7 66.6 78.8 85.3 | 3.0 5.6 7.5 7.5 6.8 | 67.6 46.7 23.0 11.9 2.5 | 6.1 3.6 1.3 0.5 |
| | The reaction mixture was heated at 55° C. for 7.5 hours then cooled to room temperature where it was stirred for 60 hours. Workup of the reaction mixture yielded 4.2 g of oil, which solidified. | | | | | | | | | |
| 63 | 4.0 g 0.0091 mole | K2CO3; 2.5 g | 0.14 g 0.0009 mole | DMA 3.8 | R.T. to | 1.0 2.0 | 20.4 22.9 | 5.8 | 71.9 58.3 | 5.8 9.8 |

TABLE 1-continued

Process for the Dehydrohalogenation of 3-(2,2-Dichloro-3,3,3-trifluoropropyl)-2,2-dimethylcyclopropanecarboxylic Acid Esters

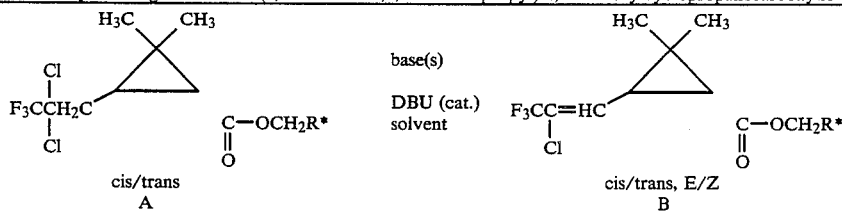

| Run | Propyl Ester (A);[1] Weight/Moles/ Equiv. | Base(s) Weight/Moles/Mol Equiv. | DBU[2]; Weight/Moles/ Mol Equiv. | Solvent; ml/gram of Propyl Ester | Reaction Temperature (°C.) | Time into Reaction (hr) | 1-Propenyl Ester (B)[1] cis | trans | Propyl Ester (A) cis | trans |
|---|---|---|---|---|---|---|---|---|---|---|
| | 1.0 equiv. | 0.0182 mole 2.0 equiv. | 0.1 equiv. | | 55 | 4.0 6.0 | 51.8 77.6 | 6.1 7.0 | 36.6 12.8 | 2.2 |
| | The reaction mixture was heated at 55° C. for 8.0 hours then cooled to room temperature where it was stirred for 16–18 hours. | | | | | | | | | |
| 64 | 4.0 g 0.0091 mole 1.0 equiv. | K₂CO₃; 2.5 g 0.0182 mole 2.0 equiv. | 0.35 g 0.0023 mole 0.25 mole | DMA 3.8 | R.T. to 55 | 1.0 2.0 3.0 | 53.5 51.8 55.1 | 13.0 15.3 14.6 | 30.9 27.5 25.8 | 2.5 5.2 4.4 |
| 65 | 6.0 g 0.0137 mole 1.0 equiv. | K₂CO₃; 9.5 g 0.0685 mole 5.0 equiv. | 0.2 g 0.0014 mole 0.1 equiv. | DMA 2.5 | 55–60 | 4.0 6.0 | 39.4 47.2 | 18.5 20.5 | 30.8 24.1 | 7.1 4.4 |
| | The reaction mixture was heated at 55–60° C. for the entire 6.0 hour reaction time. Workup of the reaction mixture yielded 5.3 g of oil. | | | | | | | | | |
| 66 | 6.0 g 0.0137 mole 1.0 equiv. | K₂CO₃; 9.5 g 0.0685 mole 5.0 equiv. | 0.5 g 0.0034 mole 0.25 equiv. | DMA 2.5 | 55–60 | 2.0 4.0 6.0 24.0 | 53.3 63.6 65.8 71.6 | 23.3 23.9 24.5 22.3 | 18.8 8.6 6.2 3.2 | 2.9 |
| | The reaction mixture was heated at 55–60° C. for the entire 24.0 hour reaction time. Workup of the reaction mixture yielded 5.2 g of oil. | | | | | | | | | |
| 67 | 5.0 g 0.0114 mole 1.0 equiv. | K₂CO₃; 3.2 g 0.0228 mole 2.0 equiv. | 0.43 g 0.0029 mole 0.25 equiv. | DMA 3.0 | R.T. to 60 | 1.0 2.5 7.0 103.0 | 53.6 81.0 68.9 98.6 | 14.3 7.9 12.8 | 30.9 9.2 16.8 | |
| | Of the 103.0 hour reaction time a total of 7.0 hours was at 60° C. The remaining 96.0 hours were at room temperature. Workup of the reaction mixture yielded 4.1 g of solid (yield is 96.7%) cis/trans ratio is 89/8. | | | | | | | | | |
| 68 | 6.0 g 0.0137 mole 1.0 equiv. | K₂CO₃; 3.8 g 0.0274 mole 2.0 equiv. | 0.5 g 0.0034 mole 0.25 equiv. | CH₃CN 2.5 | 55–60 | 2.0 4.0 6.0 24.0 | 25.3 30.2 35.3 52.2 | 15.1 16.9 18.9 23.1 | 44.7 39.4 34.8 19.6 | 12.6 10.0 7.2 2.7 |
| | The reaction mixture was heated at 55–60° C. for the entire 24.0 hour reaction time. Workup of the reaction mixture yielded 5.6 g of oil. | | | | | | | | | |
| 69 | 6.0 g 0.0137 mole 1.0 equiv. | K₂CO₃; 3.8 g 0.0274 mole 2.0 equiv. | 0.5 g 0.0034 mole 0.25 equiv. | EtOAc 2.5 | 55–60 | 2.0 4.0 6.0 24.0 | 6.3 8.9 12.1 30.4 | 5.7 7.2 9.0 18.0 | 61.8 59.8 58.0 40.0 | 22.0 20.1 17.7 9.1 |
| | The reaction mixture was heated at 55–6° C. for the entire 24.0 hour reaction time. | | | | | | | | | |
| 70 | 6.0 g 0.0137 mole 1.0 equiv. | Na₂CO₃; 2.9 g 0.0274 mole 2.0 equiv. | 0.5 g 0.0034 mole 0.25 equiv. | DMA 2.5 | 60 | 3.0 6.0 24.0 | 21.2 28.0 48.2 | 11.7 15.1 21.2 | 50.0 42.4 23.6 | 13.8 11.3 4.6 |
| | The reaction mixture was heated at 60° C. for the entire 24.0 hour reaction time. Workup of the reaction mixture yielded 5.6 g of oil. | | | | | | | | | |
| 71 | 6.0 g 0.0137 mole 1.0 equiv. | Na₂CO₃; 7.2 g 0.0685 mole 5.0 equiv. | 0.5 g 0.0034 mole 0.25 equiv. | DMA 2.5 | 60 | 3.0 6.0 24.0 | 30.4 37.6 64.3 | 14.8 17.8 23.4 | 42.5 34.8 8.3 | 9.8 8.6 1.1 |
| | The reaction mixture was heated at 60° C. for the entire 24.0 hour reaction time. Workup of the reaction yielded 5.2 g of oil. | | | | | | | | | |
| 72 | 4.0 g 0.0091 mole 1.0 equiv. | Li₂CO₃; 1.3 g 0.0182 mole 2.0 equiv. | 0.35 g 0.0023 mole 0.25 equiv. | DMA 2.5 | 55 | 6.0 | 14.5 | 11.4 | 55.3 | 18.8 |
| | The reaction mixture was heated at 55° C. for the entire 6.0 hour reaction time. | | | | | | | | | |
| 73 | 4.0 g 0.0091 mole 1.0 equiv. | Li₂CO₃; 3.4 g 0.0455 mole 5.0 equiv. | 0.35 g 0.0023 mole 0.25 equiv. | DMA 2.5 | 80 | 4.0 6.0 24.0 | 30.2 30.0 36.4 | 2.2 1.7 2.1 | 60.3 59.4 55.0 | 3.1 3.0 3.0 |
| | The reaction mixture was heated at 80° C. for the entire 24.0 hour reaction time. | | | | | | | | | |
| 74 | 4.0 g 0.0091 mole 1.0 equiv. | Li₂CO₃; 3.4 g 0.0455 mole 5.0 equiv. | 0.35 g 0.023 mole 0.25 equiv. | DMA 2.5 | R.T. to 123 | 4.5 25.5 | 18.5 23.9 | 16.3 17.8 | 23.7 16.6 | 15.2 7.6 |
| | Of the 27.25 hour reaction time a total of 11.25 hours was at 123° C. The remaining 16.0 hours were at room temperature. | | | | | | | | | |
| 75 | 4.0 g | BaCO₃; | 0.35 g | DMA | 55–125 | 4.0 | 20.8 | 12.9 | 48.0 | 15.5 |

TABLE 1-continued
Process for the Dehydrohalogenation of 3-(2,2-Dichloro-3,3,3-trifluoropropyl)-2,2-dimethylcyclopropanecarboxylic Acid Esters $$\underset{\underset{A}{\text{cis/trans}}}{\text{F}_3\text{CCH}_2\text{C}(\text{Cl})_2-\overset{\text{H}_3\text{C}\ \text{CH}_3}{\triangle}-\text{C}(=\text{O})\text{OCH}_2\text{R}^*} \xrightarrow[\text{solvent}]{\text{base(s)} \atop \text{DBU (cat.)}} \underset{\underset{B}{\text{cis/trans, E/Z}}}{\text{F}_3\text{CC}=\text{CH}(\text{Cl})-\overset{\text{H}_3\text{C}\ \text{CH}_3}{\triangle}-\text{C}(=\text{O})\text{OCH}_2\text{R}^*}$$

| Run | Propyl Ester (A);[1] Weight/Moles/ Equiv. | Base(s) Weight/Moles/Mol Equiv. | DBU[2]; Weight/Moles/ Mol Equiv. | Solvent; ml/gram of Propyl Ester | Reaction Temperature (°C.) | Time into Reaction (hr) | 1-Propenyl Ester (B)[1] cis | trans | Propyl Ester (A) cis | trans |
|---|---|---|---|---|---|---|---|---|---|---|
|  | 0.0091 mole 1.0 equiv. | 3.6 g 0.0182 mole 2.0 equiv. | 0.0023 mole 0.25 equiv. | 2.5 |  | 6.0 24.0 | 20.3 51.9 | 12.6 26.6 | 46.3 7.6 | 15.1 2.7 |
|  | Of the 24.0 hour reaction time a total of 6.0 hours were at 55° C. The remaining 18.0 hours were at 125° C. | | | | | | | | | |
| 76 | 4.0 g 0.0091 mole 1.0 equiv. | BaCO3; 9.0 g 0.0455 mole 5.0 equiv. | 0.35 g 0.0023 mole 0.25 equiv. | DMA 2.5 | 125 | 4.0 6.0 | 20.3 21.3 | 17.2 26.2 | 23.2 18.6 | 6.9 5.3 |
|  | The reaction mixture was heated at 125° C. for the entire 6.0 hour reaction time. | | | | | | | | | |
| 77 | 4.0 g 0.0091 mole 1.0 equiv. | SrCO3; 2.7 g 0.0182 mole 2.0 equiv. | 0.35 g 0.0023 mole 0.25 equiv. | DMA 2.5 | 55-125 | 4.0 6.0 24.0 | 21.8 21.7 49.2 | 13.5 13.0 21.6 | 47.2 45.4 9.6 | 14.8 14.0 3.0 |
|  | Of the 24.0 hour reaction time a total of 6.0 hours was at 55° C. The remaining 18.0 hours were at 125° C. | | | | | | | | | |
| 78 | 4.0 g 0.0091 mole 1.0 equiv. | SrCO3; 6.8 g 0.0455 mole 5.0 equiv. | 0.35 g 0.0023 mole 0.25 equiv. | DMA 2.5 | R.T. to 123-125 | 4.5 52.25 | 20.1 24.9 | 21.5 20.0 | 20.8 28.0 | 3.2 12.8 |
|  | Of the 52.25 hour reaction time a total of 20.25 hours was at 123-125° C. The remaining 32.0 hours were at room temperature. | | | | | | | | | |
| 79 | 4.0 g 0.0091 mole 1.0 equiv. | CsCO3; 4.2 g 0.0182 mole 2.0 equiv. | 0.35 g 0.0023 mole 0.25 equiv. | DMA 2.5 | 55-125 | 4.0 6.0 24.0 | 50.0 50.9 55.2 | 8.9 6.8 3.3 | 32.1 31.0 28.6 | 4.2 2.5 |
|  | Of the 24.0 hour reaction time a total of 6.0 hours was at 55° C. The remaining 18.0 hours were at 125° C. | | | | | | | | | |
| 80 | 4.0 g 0.0091 mole 1.0 equiv. | (NH4)2CO3; 1.8 g 0.0182 mole 2.0 equiv. | 0.35 g 0.0023 mole 0.25 equiv. | DMA 2.5 | 55 | 4.0 6.0 | 8.0 6.8 | 7.4 6.0 | 58.3 43.2 | 21.0 15.2 |
|  | The reaction mixture was heated at 55° C. for the entire 6.0 hour reaction time. | | | | | | | | | |
| 81 | 4.0 g 0.0091 mole 1.0 equiv. | RbCO3; 4.2 g 0.0182 mole 2.0 equiv. | 0.35 g 0.0023 mole 0.25 equiv. | DMA 2.5 | 55 | 4.0 6.0 | 10.4 12.0 | 11.5 13.2 | 45.7 43.1 | 20.3 18.1 |
|  | The reaction mixture was heated at 55° C. for the entire 6.0 hour reaction time. | | | | | | | | | |
| 82 | 4.0 g 0.0091 mole 1.0 equiv. | 2 ZnCO3.3 Zn(OH)2; 10.0 g 0.0182 mole 2.0 equiv. | 0.35 g 0.0023 mole 0.25 equiv. | DMA 3.8 | 55 | 4.0 6.0 | 7.2 7.3 | 6.9 6.8 | 58.8 57.2 | 20.9 19.8 |
|  | The reaction mixture was heated at 55° C. for the entire 6.0 hour reaction time. | | | | | | | | | |
| 83 | 4.0 g 0.0091 mole 1.0 equiv. | 4 MgCO3.Mg(OH)2.5 H2O; 8.8 g 0.0182 mole 2.0 equiv. | 0.35 g 0.0023 mole 0.25 equiv. | DMA 10 | 55 | 4.0 6.0 | 7.9 9.4 | 7.2 8.1 | 57.9 55.2 | 20.3 18.7 |
|  | The reaction mixture was heated at 55° C. for the entire 6.0 hour reaction time. The relatively poor results obtained are accounted for by the presence of water in the base. | | | | | | | | | |
| 84 | 5.0 g 0.0114 mole 1.0 equiv. | Et3N; 2.4 g 0.0231 mole 2.0 equiv. | 0.43 g 0.0029 mole 0.25 equiv. | DMA 3.0 | R.T. to 55-60 | 24.0 54.0 | 27.7 26.5 | 5.6 6.0 | 56.8 47.1 | 7.8 17.9 |
|  | Of the 54.0 hour reaction time a total of 18.0 hours was at 55-60° C. The remaining 36.0 hours were at room temperature. | | | | | | | | | |
| 85 | 4.0 g 0.0091 mole 1.0 equiv. | triethylenetetramine; 2.7 g 0.0182 mole 2.0 equiv. | 0.35 g 0.0023 mole 0.25 equiv. | DMA 2.5 | R.T. to 71-75 | 4.5 21.5 | 24.6 34.5 | 19.9 17.4 | 36.4 20.5 | 12.6 2.4 |
|  | Of the 21.5 hour reaction time a total of 5.5 hours was at 71-75° C. The remaining 16.0 hours were at room temperature. | | | | | | | | | |
| 86 | 4.0 g 0.0092 mole 1.0 equiv. | alumina; 7.0 g — | 0.35 g 0.0023 mole 0.25 equiv. | DMA 2.5 | 60 | 4.0 6.0 24.0 | 11.7 19.3 19.3 | 10.2 11.0 11.0 | 58.3 50.4 50.4 | 16.8 16.6 16.6 |
|  | The reaction mixture was heated at 60° C. for the entire 24.0 hour reaction time. | | | | | | | | | |
| 87 | 5.0 g 0.0114 mole 1.0 equiv. | sodium oxalate; 7.7 g 0.0571 mole 5.0 equiv. | 0.43 g 0.0028 mole 0.25 equiv. | DMA 2.4 | 85 | 50.0 6.0 24.0 | 25.3 3.1 26.5 | 1.2 4.2 1.4 | 70.7 60.7 67.2 | 1.5 1.2 1.4 |

TABLE 1-continued

Process for the Dehydrohalogenation of 3-(2,2-Dichloro-3,3,3-trifluoropropyl)-2,2-dimethylcyclopropanecarboxylic Acid Esters $$\underset{\substack{\text{cis/trans}\\A}}{\text{F}_3\text{CCH}_2\overset{\text{Cl}}{\underset{\text{Cl}}{\text{C}}}\text{—}\underset{\substack{\text{H}_3\text{C}\quad\text{CH}_3\\ \diagup\hspace{-0.3em}\diagdown}}{\phantom{X}}\text{—}\underset{\text{O}}{\overset{\phantom{O}}{\text{C}}}\text{—OCH}_2\text{R}^*} \xrightarrow[\text{solvent}]{\text{base(s)}\atop\text{DBU (cat.)}} \underset{\substack{\text{cis/trans, E/Z}\\B}}{\text{F}_3\text{CC}=\text{HC}\underset{\text{Cl}}{\phantom{X}}\text{—}\underset{\substack{\text{H}_3\text{C}\quad\text{CH}_3\\ \diagup\hspace{-0.3em}\diagdown}}{\phantom{X}}\text{—}\underset{\text{O}}{\overset{\phantom{O}}{\text{C}}}\text{—OCH}_2\text{R}^*}$$

| Run | Propyl Ester (A);[1] Weight/Moles/ Equiv. | Base(s) Weight/Moles/Mol Equiv. | DBU[2]; Weight/Moles/ Mol Equiv. | Solvent; ml/gram of Propyl Ester | Reaction Temperature (°C.) | Time into Reaction (hr) | GC Analysis of the Reaction Mixture (area %) | | | |
|---|---|---|---|---|---|---|---|---|---|---|
| | | | | | | | 1-Propenyl Ester (B)[1] | | Propyl Ester (A) | |
| | | | | | | | cis | trans | cis | trans |
| | At 5.0 hours into the reaction time 0.2 equiv. of benzyltriethylammonium bromide was added. The reaction mixture was heated at 85° C. for the entire 24.0 hour reaction time. | | | | | | | | | |
| 88 | 4.0 g 0.0091 mole 1.0 equiv. | Na₂SO₄; 6.5 g 0.0455 mole 5.0 equiv. | 0.35 g 0.0023 mole 0.25 equiv. | DMA 2.5 | R.T. to 80–84 | 4.5 | 20.9 | 14.0 | 43.8 | 15.5 |
| | Of the 22.25 hour reaction time a total of 6.0 hours was at 80–84° C. The remaining 16.25 hours were at room temperature. | | | | | | | | | |

[1]The terms "propyl ester" and "1-propenyl ester" in this table refer to the esters of cis/trans-3-(2,2-dichloro-3,3,3-trifluoropropyl)-2,2-dimethylcyclopropanecarboxlic acid and cis/trans-3-[2-(E/Z)-chloro-3,3,3-trifluoro-1-propenyl]-2,2-diemthylcyclopropanecarboxylic acid, respectively.
[2]DBU is 1,8-diazabicyclo[5.4.0]undec-7-ene
[3]DMA is dimethylacetamide
[4]R.T. is room temperature
*Unless otherwise noted, R is 2,6-dichlorophenyl

We claim:

1. Process for the preparation of esters of cis or trans-3-[2-(E/Z)-halo-3,3,3-trihalo-1-propenyl]-2,2-dimethylcyclopropanecarboxylic acid, or mixtures thereof, which comprises dehydrohalogenating the corresponding esters of cis or trans-3-(2,2-dihalo-3,3,3-trihalopropyl)-2,2-dimethylcyclopropanecarboxylic acid, or said mixtures, with a catalytic amount of a cyclic amidine selected from 1,8-diazabicyclo[5.4.0]undec-7-ene,1.5-diazabicyclo[4.3.0]non-5-ene, or mixtures thereof, in the presence of an alkali or alkaline earth metal base, or combinations thereof, and a polar aprotic solvent under essentially anhydrous conditions.

2. The process of claim 1 wherein the base is selected from carboxylates, bicarbonates, or carbonates of alkali or alkaline earth metals; oxides of alkaline earth metals; or mixtures thereof.

3. The process of claim 1 or 2 wherein the base is employed in at least stoichiometric amounts.

4. The process of claim 1 or 2 wherein the base is sodium or potassium acetate.

5. The process of claim 1 or 2 wherein the base is sodium or potassium carbonate or bicarbonate.

6. The process of claim 1 or 2 wherein the base is a mixture of an alkali metal acetate and an alkaline earth metal oxide.

7. The process of claim 6 wherein the base is a mixture of sodium or potassium acetate and calcium oxide.

8. The process of claim 1 wherein the reaction temperature is from about room temperature to 150° C.

9. The process of claim 1 wherein the ester moiety is $C_{1-6}$ lower alkyl, arylalkyl, or substituted arylalkyl.

10. The process of claim 1 wherein the ester starting material is 2,6-dichlorophenylmethyl cis/trans-3-(2,2-dichloro-3,3,3-trifluoropropyl)-2,2-dimethycyclopropanecarboxylate, and the corresponding product is 2,6-dichlorophenylmethyl cis/trans-3-[2-(E/Z)-chloro-3,3,3-trifluoro-1-propenyl]-2,2-dimethylcyclopropanecarboxylate.

11. The process of claim 1 for the preparation of esters of cis or trans-3-[2-(E/Z)-chloro-3,3,3-trifluoro-1-propenyl]-2,2-dimethylcyclopropanecarboxylic acid, or mixtures thereof, which comprises dehydrohalogenating the corresponding esters of cis or trans-3-(2,2-dichloro-3,3,3-difluoropropyl)-2,2-dimethylcyclopropanecarboxylic acid, or said mixtures, with a catalytic amount of 1,8-diazobicyclo[5.4.0]undec-7-ene in the presence of a stoichiometric amount of a mixture of sodium or potassium acetate and calcium oxide, and a polar aprotic solvent.

* * * * *

UNITED STATES PATENT AND TRADEMARK OFFICE
CERTIFICATE OF CORRECTION

PATENT NO. : 4,960,922

DATED : October 2, 1990

INVENTOR(S) : John H. Hoare

It is certified that error appears in the above-identified patent and that said Letters Patent is hereby corrected as shown below:

Column 6, line 47, "G." should read --GC--. Column 9, line 40, "G." should read --GC--. Column 9, line 42, "G." should read --GC--. Column 9, line 45, "G." should read --GC--.

Signed and Sealed this

Thirteenth Day of October, 1992

Attest:

DOUGLAS B. COMER

Attesting Officer

Acting Commissioner of Patents and Trademarks